US012602888B2

(12) United States Patent
Ramani et al.

(10) Patent No.:    US 12,602,888 B2
(45) **Date of Patent:    \*Apr. 14, 2026**

(54) AUTHORING SYSTEMS AND METHODS FOR ENABLING BIDIRECTIONAL BINDING OF AUGMENTED REALITY WITH TOYS IN REAL-TIME

(71) Applicant: Purdue Research Foundation, West Lafayette, IN (US)

(72) Inventors: Karthik Ramani, West Lafayette, IN (US); Zhengzhe Zhu, West Lafayette, IN (US); Ziyi Liu, Delaware, OH (US); Tianyi Wang, West Lafayette, IN (US)

(73) Assignee: Purdue Research Foundation, West Lafayette, IN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/183,055

(22) Filed: Apr. 18, 2025

(65) Prior Publication Data

US 2025/0272929 A1      Aug. 28, 2025

Related U.S. Application Data

(63) Continuation of application No. 18/480,158, filed on Oct. 3, 2023, now Pat. No. 12,288,299.

(Continued)

(51) Int. Cl.
    *G06T 19/00*      (2011.01)
    *A63F 13/577*    (2014.01)

(Continued)

(52) U.S. Cl.
    CPC .......... *G06T 19/006* (2013.01); *A63F 13/577* (2014.09); *A63F 13/63* (2014.09);
(Continued)

(58) Field of Classification Search
    None
    See application file for complete search history.

(56) References Cited

U.S. PATENT DOCUMENTS

2017/0277253 A1 \*  9/2017  Mullen ................ G02B 27/017
2019/0325661 A1 \* 10/2019  Baumbach .............. G06T 15/04
(Continued)

*Primary Examiner* — Duane N Taylor, Jr.
(74) *Attorney, Agent, or Firm* — Maginot, Moore & Beck LLP

(57) ABSTRACT

An augmented reality (AR) interaction authoring system is described. The AR interaction authoring system is configured to support the real-time creation of AR applications to support AR-enhanced toys. The design of the AR interaction authoring system enables bidirectional interactions between the physical-virtual space of toys and AR. The AR interaction authoring system allows intuitive authoring of AR animations and toys actuations through programming by demonstration, while referring to the physical toy for a contextual reference. Using a visual programming interface, users can create bidirectional interactions by utilizing users' input on toys to trigger AR animations and vice versa. A plug-and-play IoT toolkit is also disclosed that includes hardware to actuate common toys. In this way, users can effortlessly integrate toys into the virtual world in an impromptu design process, without lengthy electronic prototyping.

18 Claims, 23 Drawing Sheets

Related U.S. Application Data

(60)  Provisional application No. 63/378,093, filed on Oct. 3, 2022.

(51)  Int. Cl.

| | | |
|---|---|---|
| *A63F 13/63* | (2014.01) | |
| *A63F 13/655* | (2014.01) | |
| *G06F 3/0346* | (2013.01) | |
| *G06F 3/04815* | (2022.01) | |

(52)  U.S. Cl.
   CPC .......... *A63F 13/655* (2014.09); *G06F 3/0346* (2013.01); *G06F 3/04815* (2013.01); *G06T 2200/24* (2013.01); *G06T 2210/21* (2013.01)

(56)  References Cited

U.S. PATENT DOCUMENTS

| | | | | |
|---|---|---|---|---|
| 2021/0089161 | A1* | 3/2021 | Steinmark | ........... G06F 3/03547 |
| 2021/0134065 | A1* | 5/2021 | Ramani | ................. G06F 3/0346 |
| 2022/0066554 | A1* | 3/2022 | Byerley | .................. G06F 3/014 |
| 2022/0392171 | A1* | 12/2022 | Baughman | ............ G06T 19/006 |
| 2023/0288999 | A1* | 9/2023 | Munakata | ............... G06F 3/011 |

* cited by examiner

KNOB MODULE

130C

BUZZER & LIGHT MODULE

130H

ROTATION MODULE

130E

130F

SWITCH MODULE

130B

MOVEMENT MODULE

LINEAR ACTUATOR MODULE

130D

HAPTIC MODULE

130G

BUTTON MODULE

130A

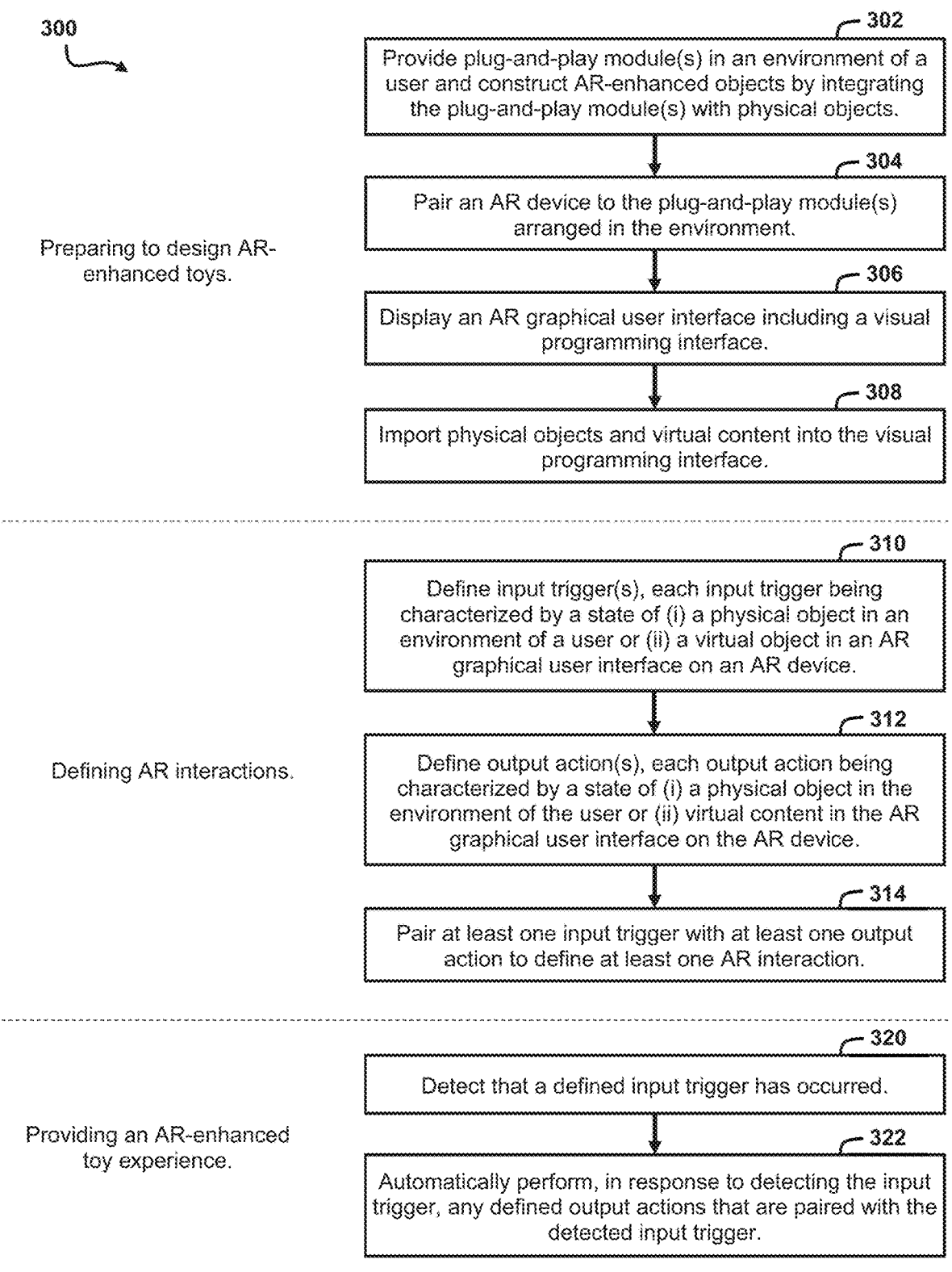

300

Preparing to design AR-enhanced toys.

302
Provide plug-and-play module(s) in an environment of a user and construct AR-enhanced objects by integrating the plug-and-play module(s) with physical objects.

304
Pair an AR device to the plug-and-play module(s) arranged in the environment.

306
Display an AR graphical user interface including a visual programming interface.

308
Import physical objects and virtual content into the visual programming interface.

Defining AR interactions.

310
Define input trigger(s), each input trigger being characterized by a state of (i) a physical object in an environment of a user or (ii) a virtual object in an AR graphical user interface on an AR device.

312
Define output action(s), each output action being characterized by a state of (i) a physical object in the environment of the user or (ii) virtual content in the AR graphical user interface on the AR device.

314
Pair at least one input trigger with at least one output action to define at least one AR interaction.

Providing an AR-enhanced toy experience.

320
Detect that a defined input trigger has occurred.

322
Automatically perform, in response to detecting the input trigger, any defined output actions that are paired with the detected input trigger.

FIG. 5

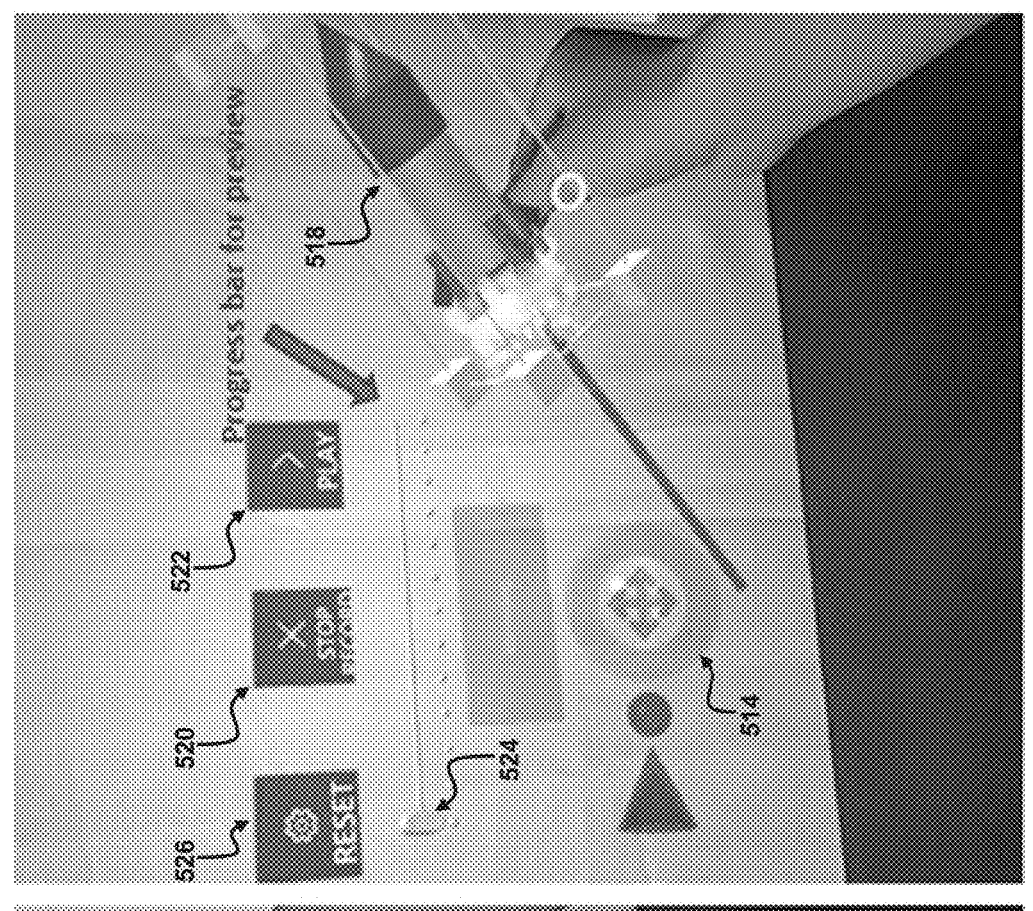
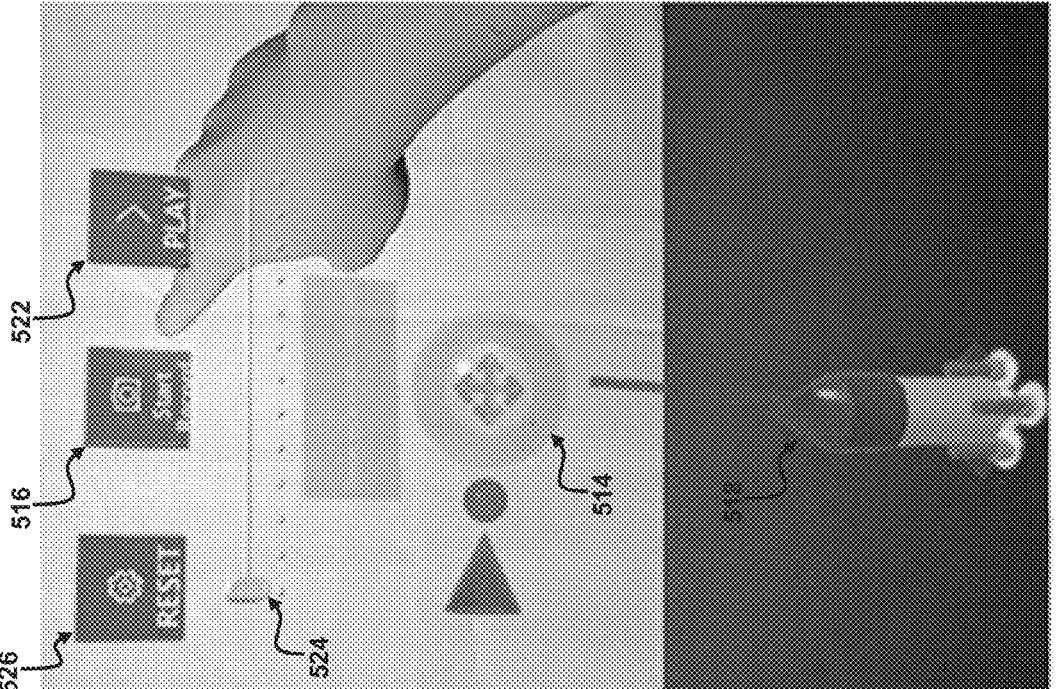
FIG. 7C

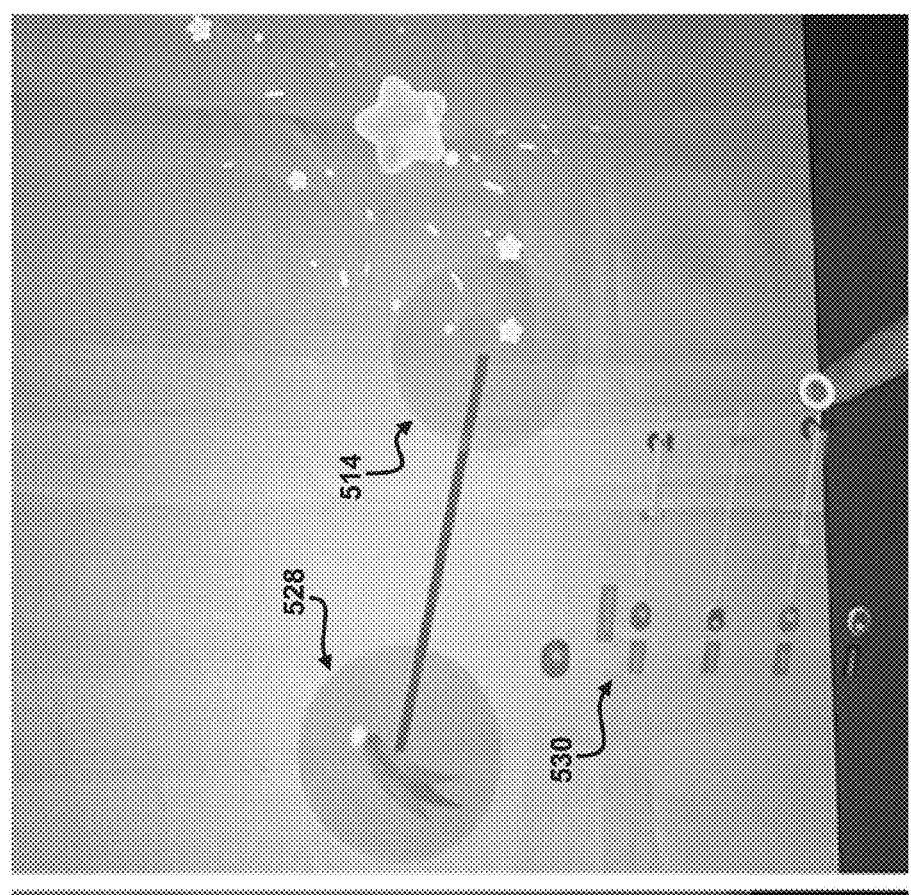
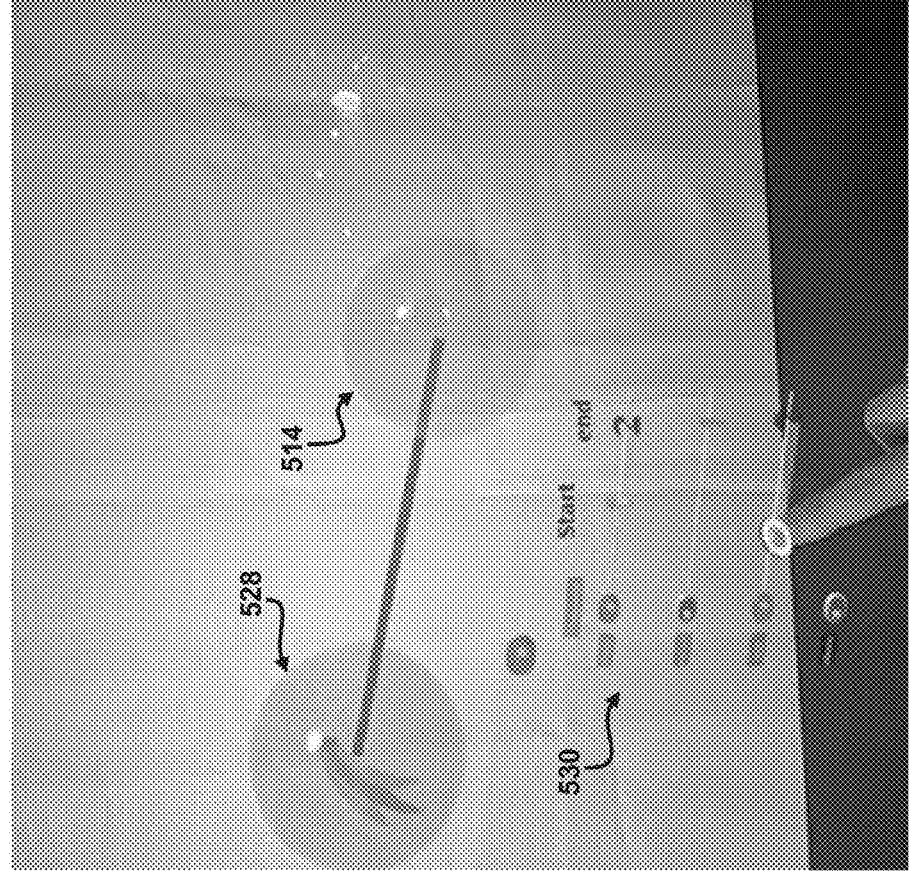
FIG. 7D

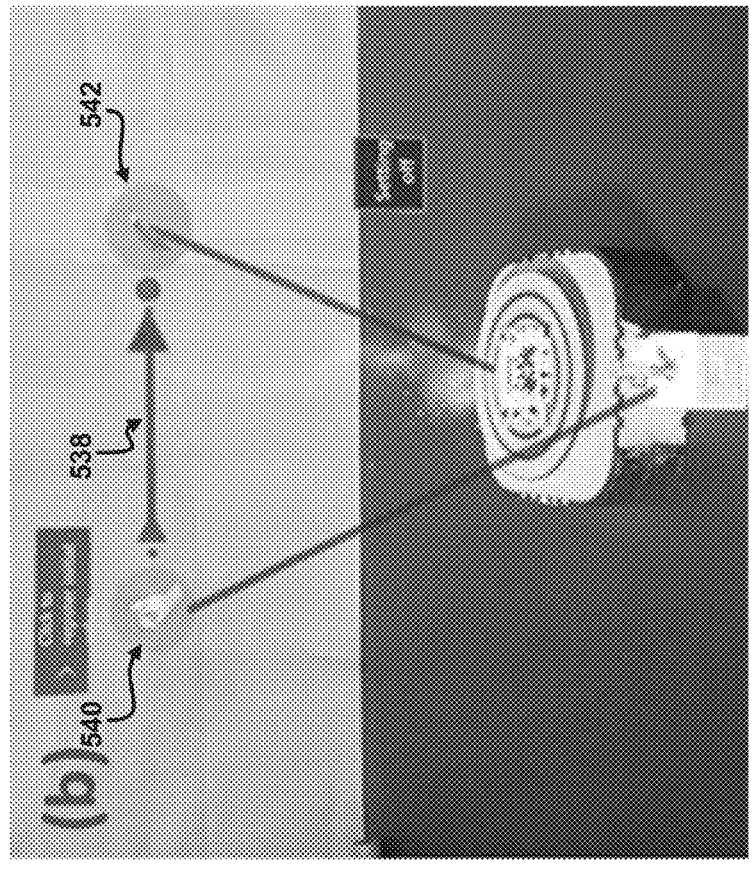
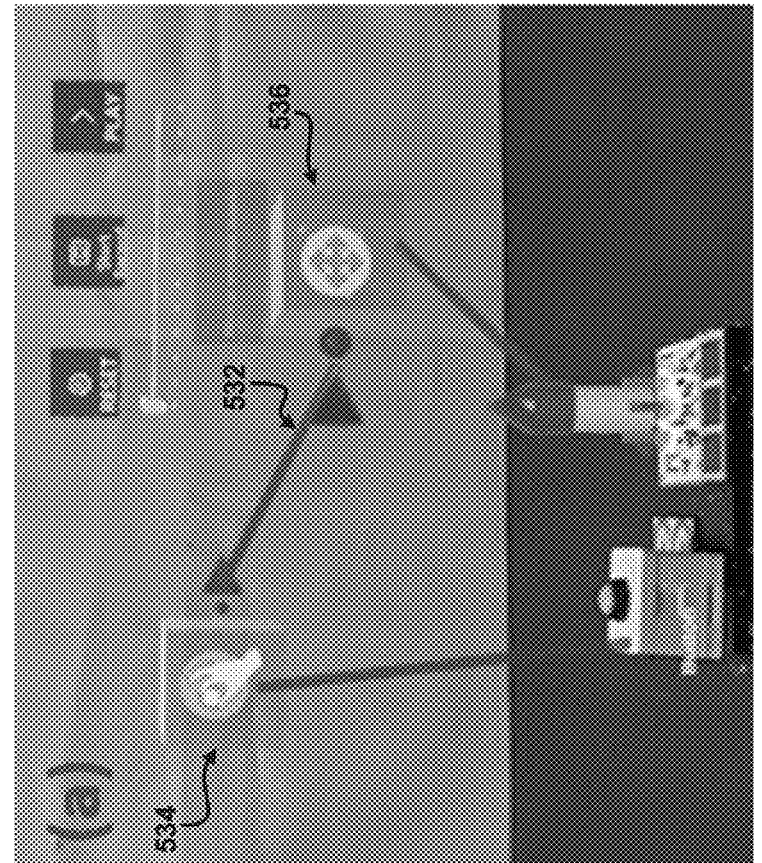
FIG. 7E

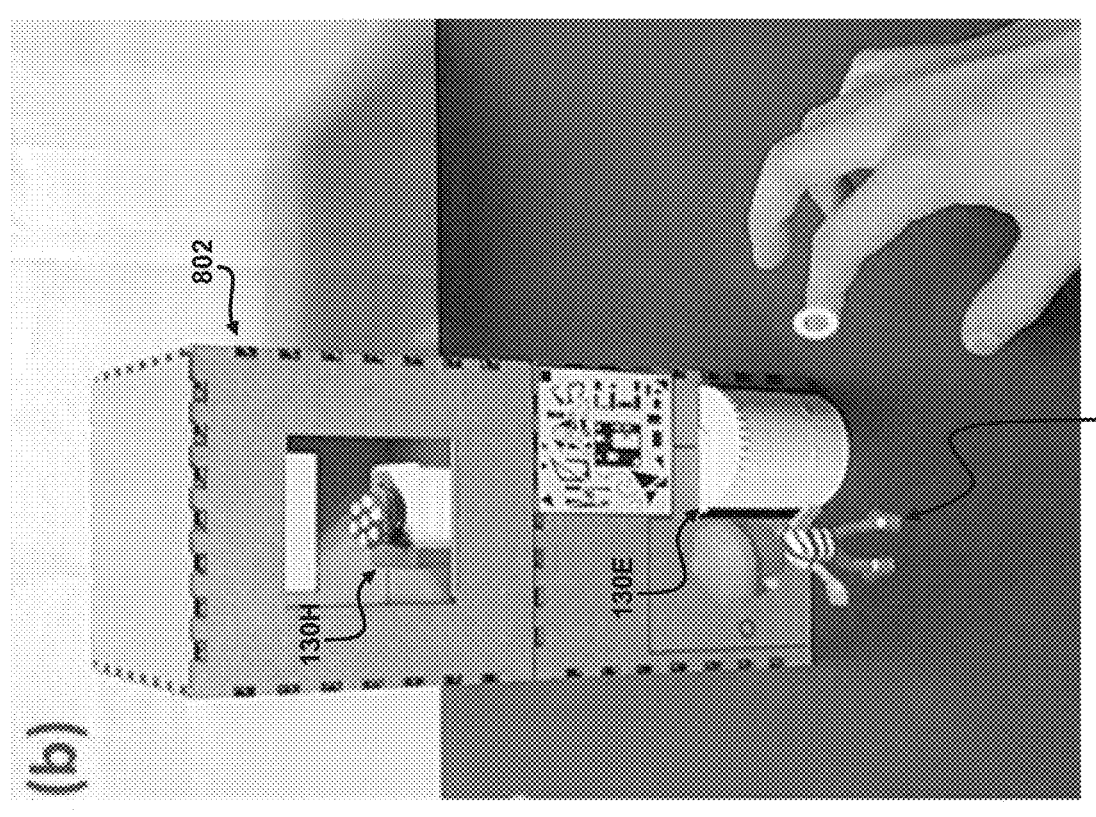
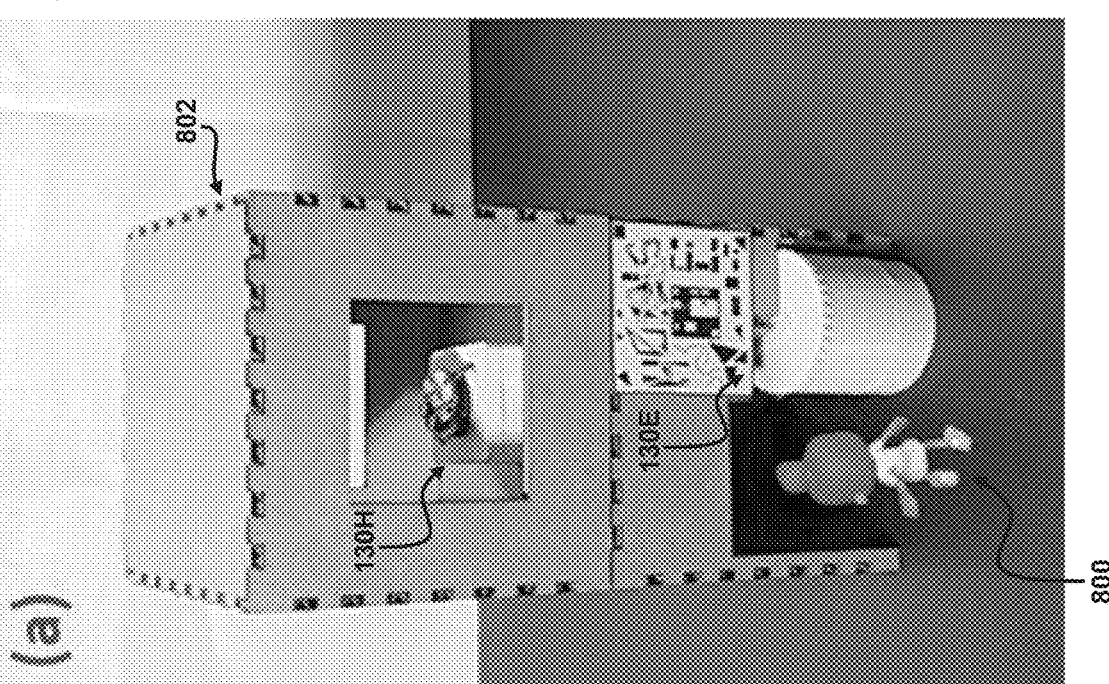
FIG. 8A

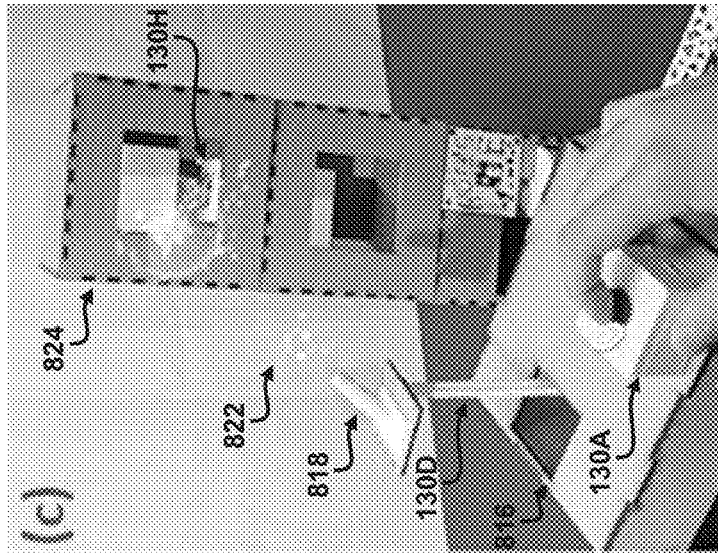
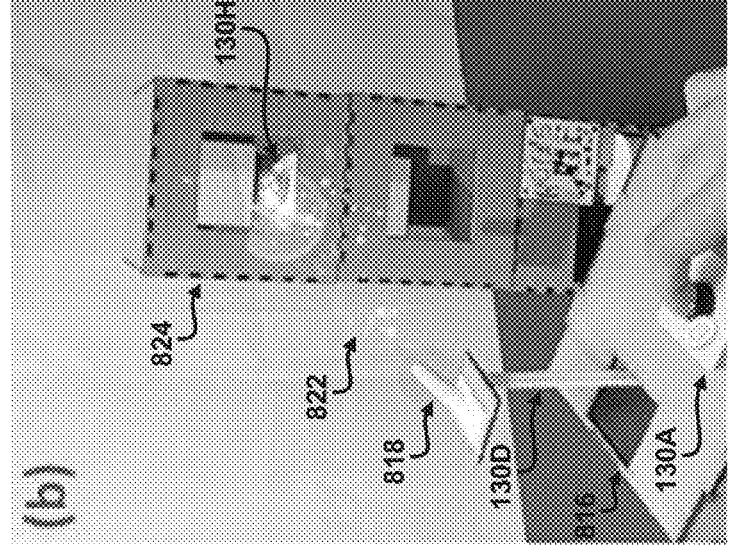
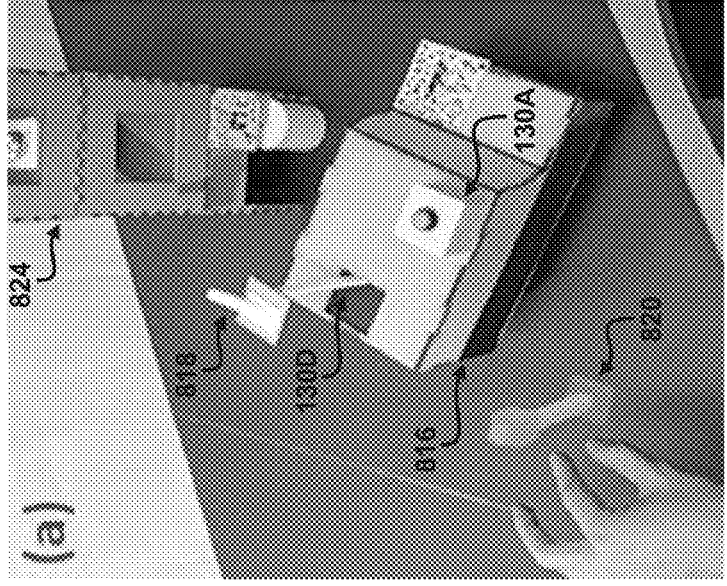
FIG. 8C

AUTHORING SYSTEMS AND METHODS FOR ENABLING BIDIRECTIONAL BINDING OF AUGMENTED REALITY WITH TOYS IN REAL-TIME

This application is a continuation of U.S. patent application Ser. No. 18/480,158, filed on Oct. 3, 2023, the contents of which are hereby incorporated by reference in its entirety. U.S. patent application Ser. No. 18/480,158 claims the benefit of priority of U.S. provisional application Ser. No. 63/378,093, filed on Oct. 3, 2022 the disclosure of which is herein incorporated by reference in its entirety.

GOVERNMENT LICENSE RIGHTS

This invention was made with government support under contract number DUE1839971 awarded by the National Science Foundation. The government has certain rights in the invention.

FIELD

The device and method disclosed in this document relates to augmented reality and, more particularly, to enabling bidirectional binding of augmented reality with toys in real-time.

BACKGROUND

Unless otherwise indicated herein, the materials described in this section are not admitted to be the prior art by inclusion in this section.

The rise of maker culture has empowered many ordinary people and novice designers to capture ideas and build their own prototype toys, instead of buying them off-the-shelf. Maker culture attracts creators from diverse backgrounds due to its freestyle design, test, and play approach, and due to its do-it-yourself (DIY) access to affordable fabrication. Toy design, a popular activity in makerspaces, empowers designers to explore different materials and create DIY toys, instead of buying them off-the-shelf.

Augmented Reality (AR), which leverages the physical and virtual world, presents designers with the possibility of enhancing traditional design. AR superimposes virtual information on the physical world, thus leveraging forms and features of physical-virtual environments. AR provides designers with the potential to enhance physical toys with visualizations and interactions previously constrained by traditional toy design. There are a handful of emerging AR-enhanced toys, from commercial products like Mario Kart Live, Iron Man AR Mask, and Lego Hidden Sides, as well as research projects like Project Zanzibar and Checkmate. These AR-enhanced toys provide players with unique experiences and scenarios beyond the constraints of physical boundaries.

The interactions enabled by AR-enhanced toys can take place bidirectionally in the physical and virtual world: physical toys can act as triggers for AR content, and AR content can act as triggers to actuate physical toys. For example, in LEGO Hidden Side, users can manipulate the LEGO blocks to unlock a hidden storyline displayed using AR. As another example, in the racing car game, Mario Kart Live: Home Circuit, users can throw a virtual bomb on opponents' physical cars to sabotage them. However, in each case, these AR-enhanced toys provide fixed AR content and interactions that are already designed into the toys.

Designers are, however, constrained by the complexity and technical difficulties of current AR content creation. Particularly, the toys mentioned above are generally produced by experienced developers with professional tools. Thus, novice designers miss out on the opportunity of imagining, designing, and implementing AR-enhanced toys based on their ideas. DIY makers and designers do not have a unified framework for virtual-physical interaction design with AR that guides users through the design thinking and ideation process. Meanwhile, conventional AR content creation processes often decouples the programming and testing environment. Developers have to project the status of the 3D physical toy from different perspectives while programming AR animations, which is mentally demanding. In addition, those tools often use text-based programming languages which have a steep learning curve and are therefore cumbersome for non-technical users to create AR applications. Thus, it would be advantageous to provide tools for end users, which address these shortcomings and enable novice users to quickly prototype AR applications to complement their physical toys.

SUMMARY

A method for providing an augmented reality interaction is disclosed. The method comprises defining, based on user inputs received via an augmented reality device, a physical input trigger of the augmented reality interaction. The physical input trigger is characterized by a physical state of a first physical object in an environment of a user. The method further comprises defining, based on user inputs received via the augmented reality device, the virtual output action of the augmented reality interaction. The virtual output action is characterized by a virtual state of virtual content to be displayed via the augmented reality device. The method further comprises detecting, with a sensor, the physical input trigger. The method further comprises displaying, in response to detecting the physical input trigger, in an augmented reality graphical user interface on a display screen of the augmented reality device. The virtual output action includes the virtual content superimposed on the environment and having the virtual state that characterizes the virtual output action. At least one of (i) the physical state that characterizes the physical input trigger and (ii) the virtual state that characterizes the virtual output action of the augmented reality interaction is defined by demonstration from the user.

A further method for providing an augmented reality interaction is disclosed. The method comprises defining, based on user inputs received via an augmented reality device, a virtual input trigger of the augmented reality interaction. The virtual input trigger is characterized by a virtual state of a first virtual object in an augmented reality graphical user interface on a display screen of the augmented reality device. The method comprises defining, based on user inputs received via the augmented reality device, the physical output action of the augmented reality interaction. The physical output action is characterized by a physical state of a first physical object in an environment of a user. The method further comprises detecting, based on user inputs received via the augmented reality device, the virtual input trigger. The method further comprises commanding, with a processor, in response to detecting the virtual input trigger, an actuator to control the first physical object to have the physical state that characterizes the physical output action. At least one of (i) the virtual state that characterizes the virtual input trigger and (ii) the physical state that characterizes the physical output action of the augmented reality interaction is defined by demonstration from the user.

BRIEF DESCRIPTION OF THE DRAWINGS

The foregoing aspects and other features of the system and methods are explained in the following description, taken in connection with the accompanying drawings.

FIG. 1C shows an exemplary workflow an AR interaction authoring system in a Play Mode.

FIG. 5 shows a flow diagram for a method for providing an AR-enhanced toy experience.

FIG. 7C shows exemplary AR graphical user interfaces of the Editor Mode for demonstrating output movements by direct manipulation of an object.

FIG. 7D shows exemplary AR graphical user interfaces of the Editor Mode for demonstrating sensory effect output action.

FIG. 7E shows exemplary AR graphical user interfaces of the Editor Mode for establishing connections between input triggers and output actions.

FIG. 8A shows an exemplary storytelling toy including a house with a security system.

FIG. 8C shows an example in which miniature toys are made more realistic.

DETAILED DESCRIPTION

Figure 1A:
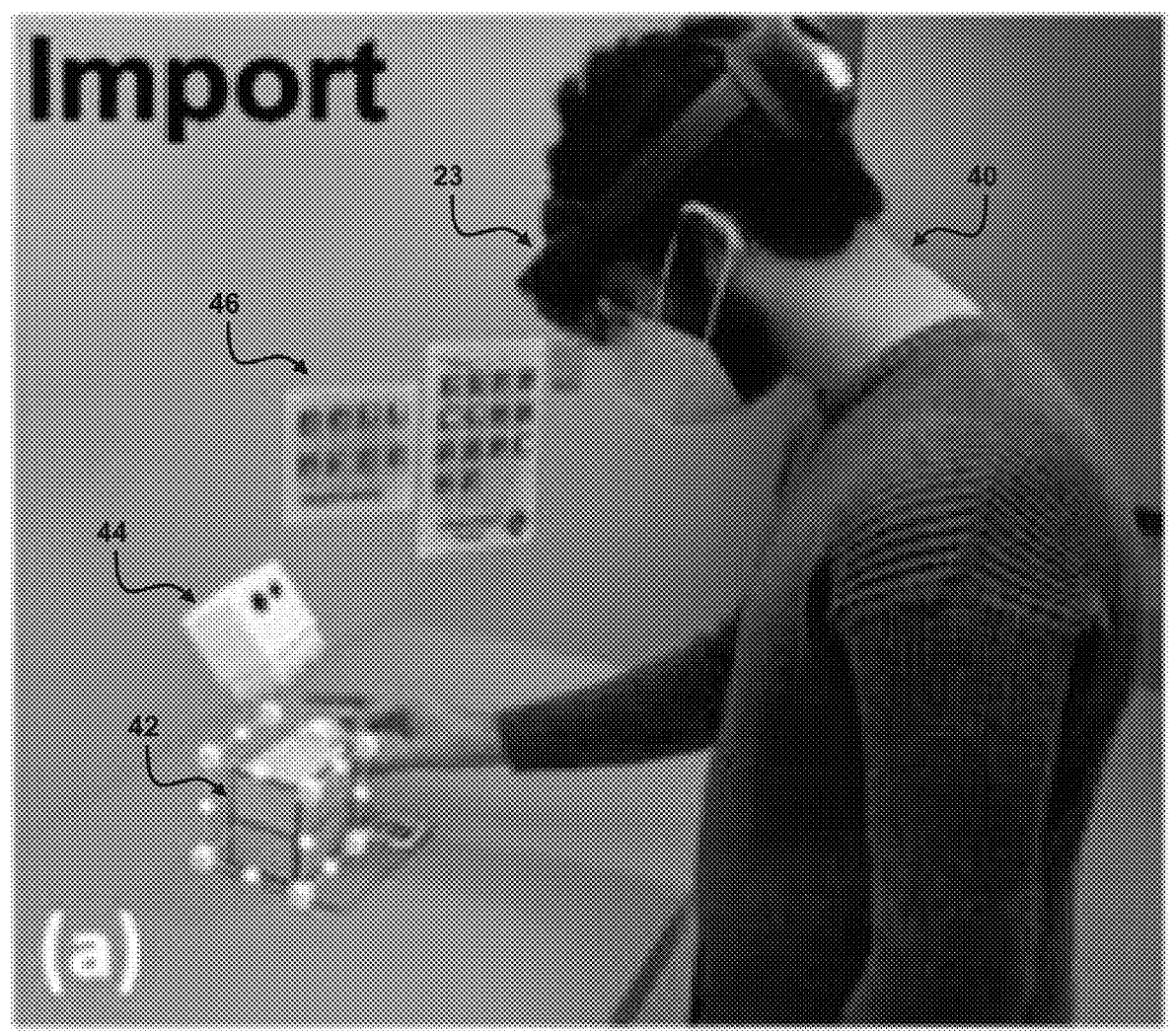
FIG. 1A shows an exemplary workflow an AR interaction authoring system in an Import Mode.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Figure 2A:
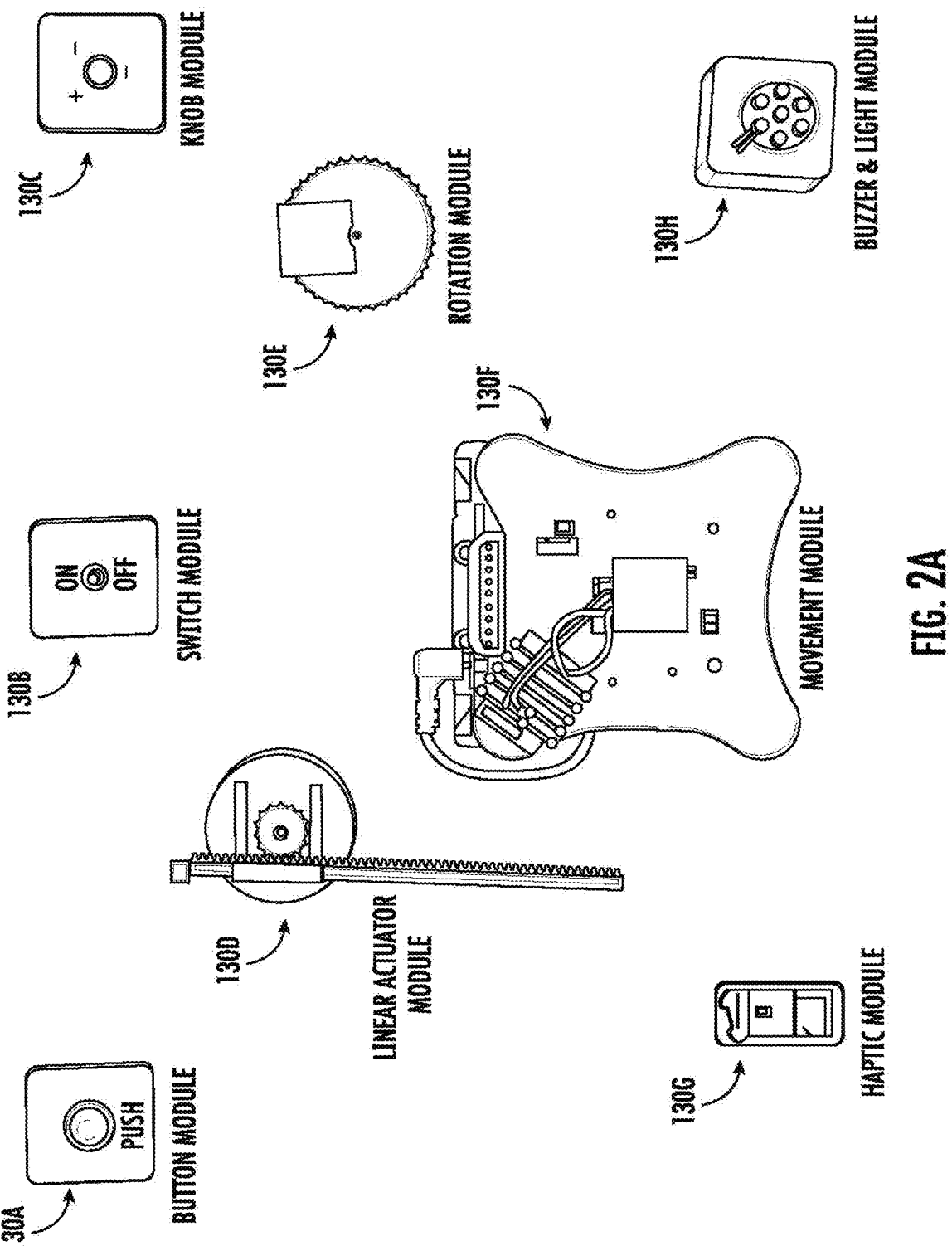
FIG. 2A shows exemplary plug-and-play modules of an IoT toolkit.
Figure 2B:
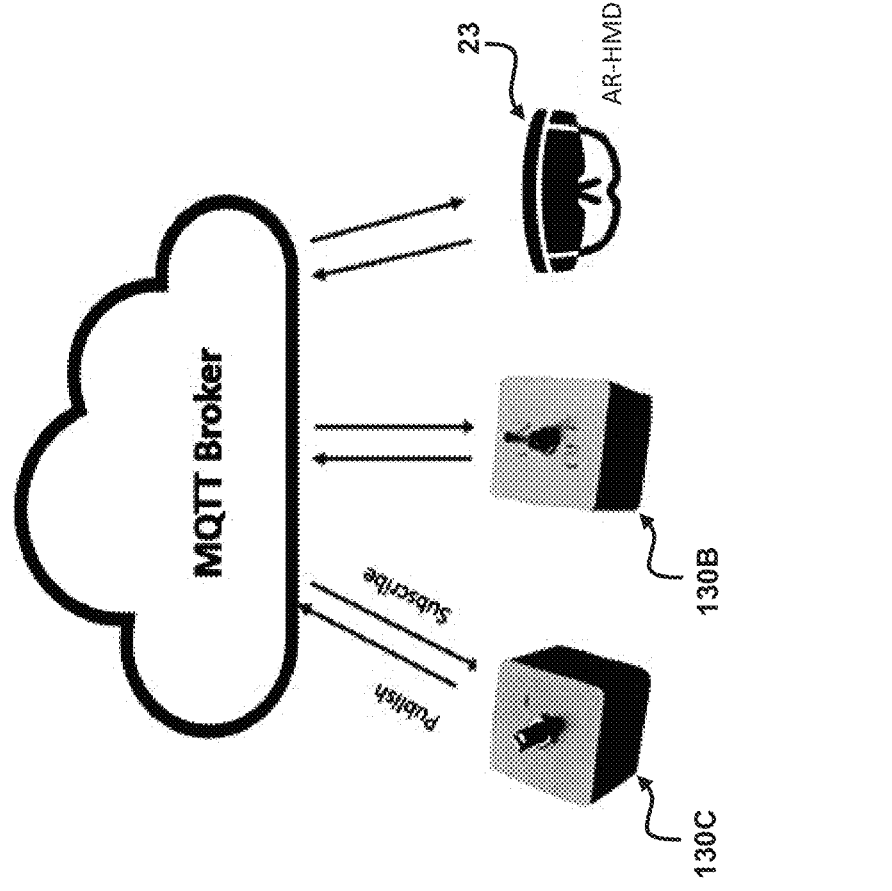
FIG. 2B shows communication between the plug-and-play modules and the AR interaction authoring system.
Figure 2C:
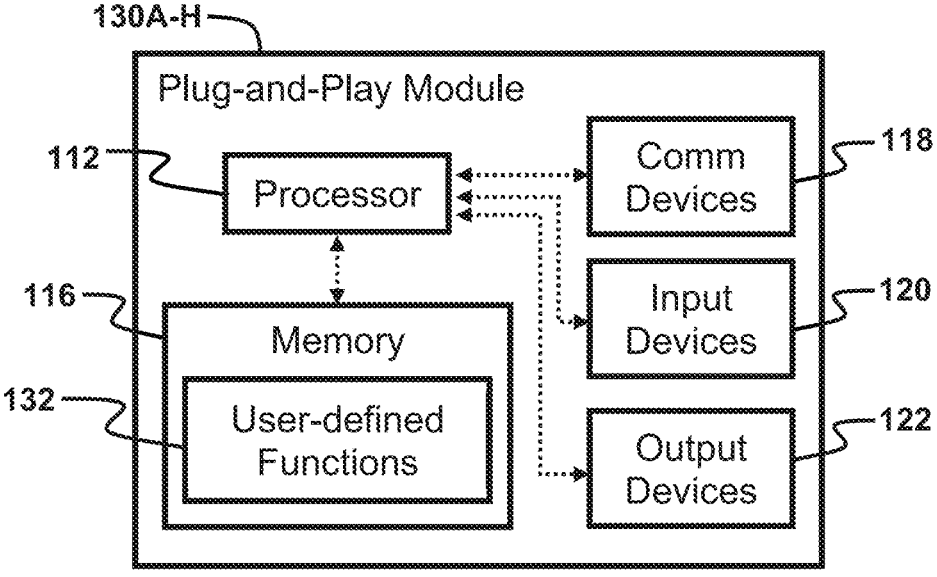
FIG. 2C shows exemplary components of each plug-and-play module.
Figure 3:
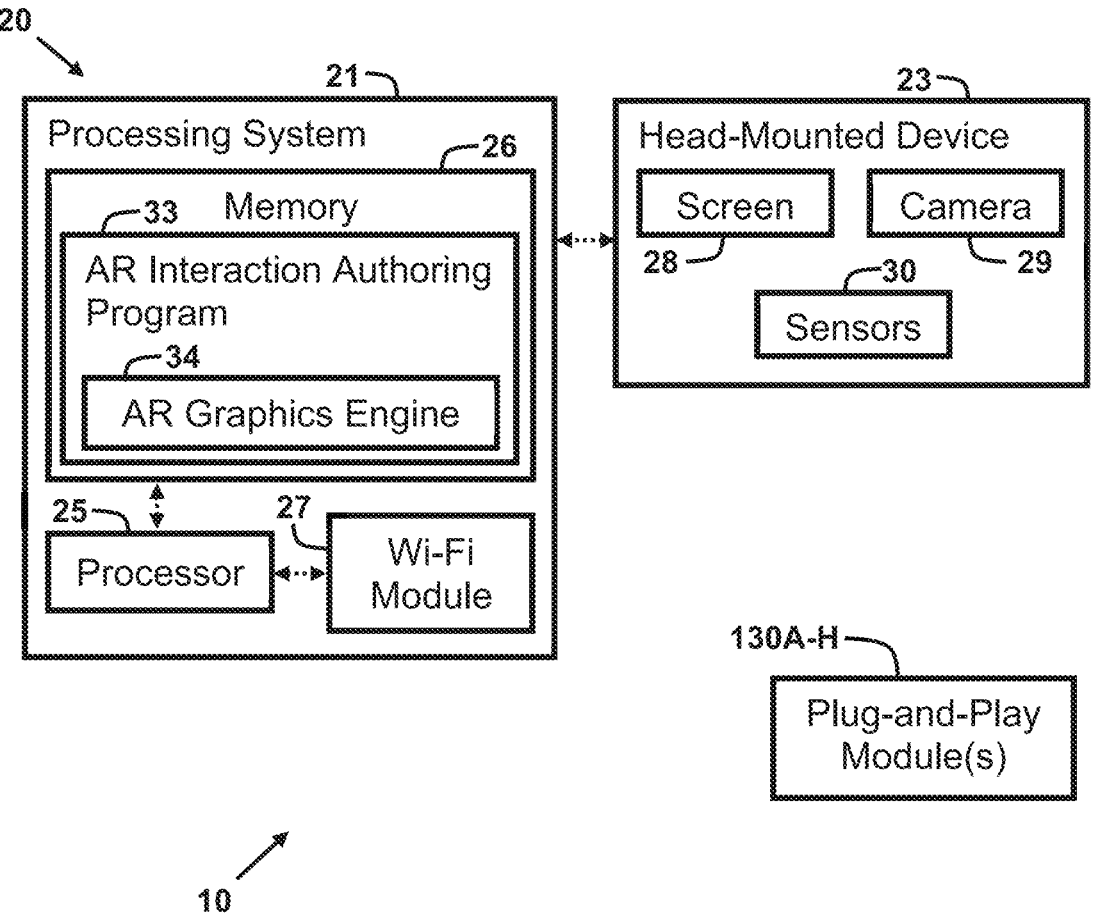
FIG. 3 shows exemplary components of an AR system of the AR interaction authoring system.

With reference to FIGS. 1-3, exemplary embodiments of an augmented reality (AR) interaction authoring system 10 are described. The AR interaction authoring system 10 is configured to support the real-time creation of AR applications to support AR-enhanced toys. The design of the AR interaction authoring system 10 enables bidirectional interactions between the physical-virtual space of toys and AR. The AR interaction authoring system 10 allows intuitive authoring of AR animations and toys actuations through programming by demonstration, while referring to the physical toy for a contextual reference. Using a visual programming interface, users can create bidirectional interactions by utilizing users' input on toys to trigger AR animations and vice versa. A plug-and-play IoT toolkit is also disclosed that includes hardware to actuate common toys. In this way, users can effortlessly integrate toys into the virtual world in an impromptu design process, without lengthy electronic prototyping.

The AR interaction authoring system 10 advantageously provides a unified framework for creating AR-enhanced toys that incorporate bidirectional physical-virtual interactions. The AR interaction authoring system 10 enables physical toys to be used as triggers to produce AR content and enables AR content to be used as triggers to actuate the physical toys. Additionally, the AR interaction authoring system 10 advantageously provides an in-situ, immersive, easy-to-use authoring environment create AR interactions through visual programming and programming by demonstration.

The AR interaction authoring system 10 incorporates an AR system 20 having an AR head-mounted device 23 (AR-HMD), which fosters an in-situ authoring workflow. By blending the authoring process into the AR environment, users have contextual information of the physical toy and its associated AR content. For example, a user may want to program a physical toy, such as a toy robot, that can trigger different virtual special effects (e.g., fire, laser beam) in response to corresponding fighting poses of the toy robot (e.g., arms forming an X or a T). To achieve this, the user can physically demonstrate the fighting poses by manipulating the toy robot and program the associated AR animations/effects on the spot using the visual programming interface, while referring to the robot for spatial context. In this way, the user can directly create virtual animations by manipulating physical and virtual objects, and without writing lines of codes.

Figure 1B:
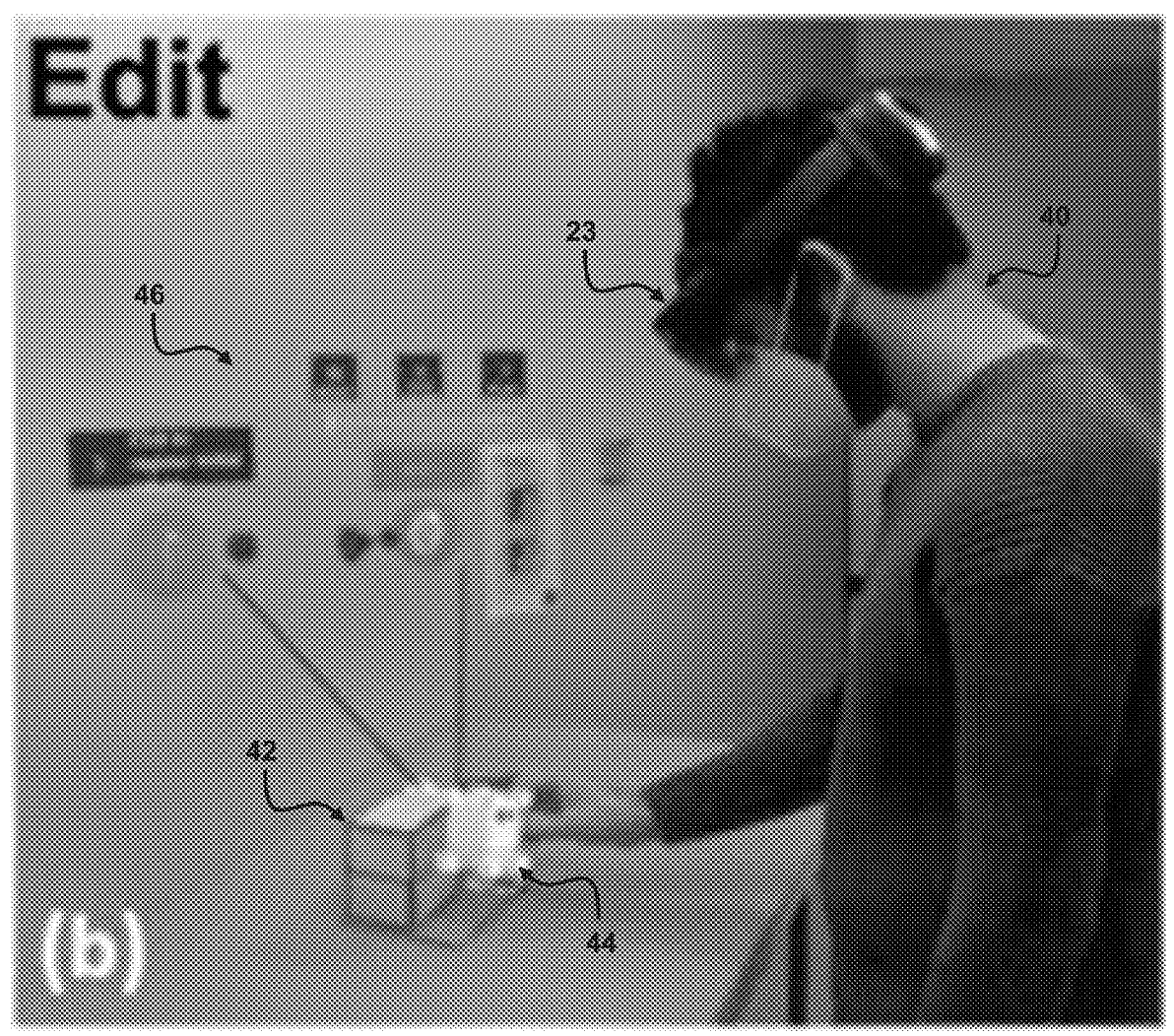
FIG. 1C shows an exemplary workflow an AR interaction authoring system in an Editor Mode.
Figure 1C:
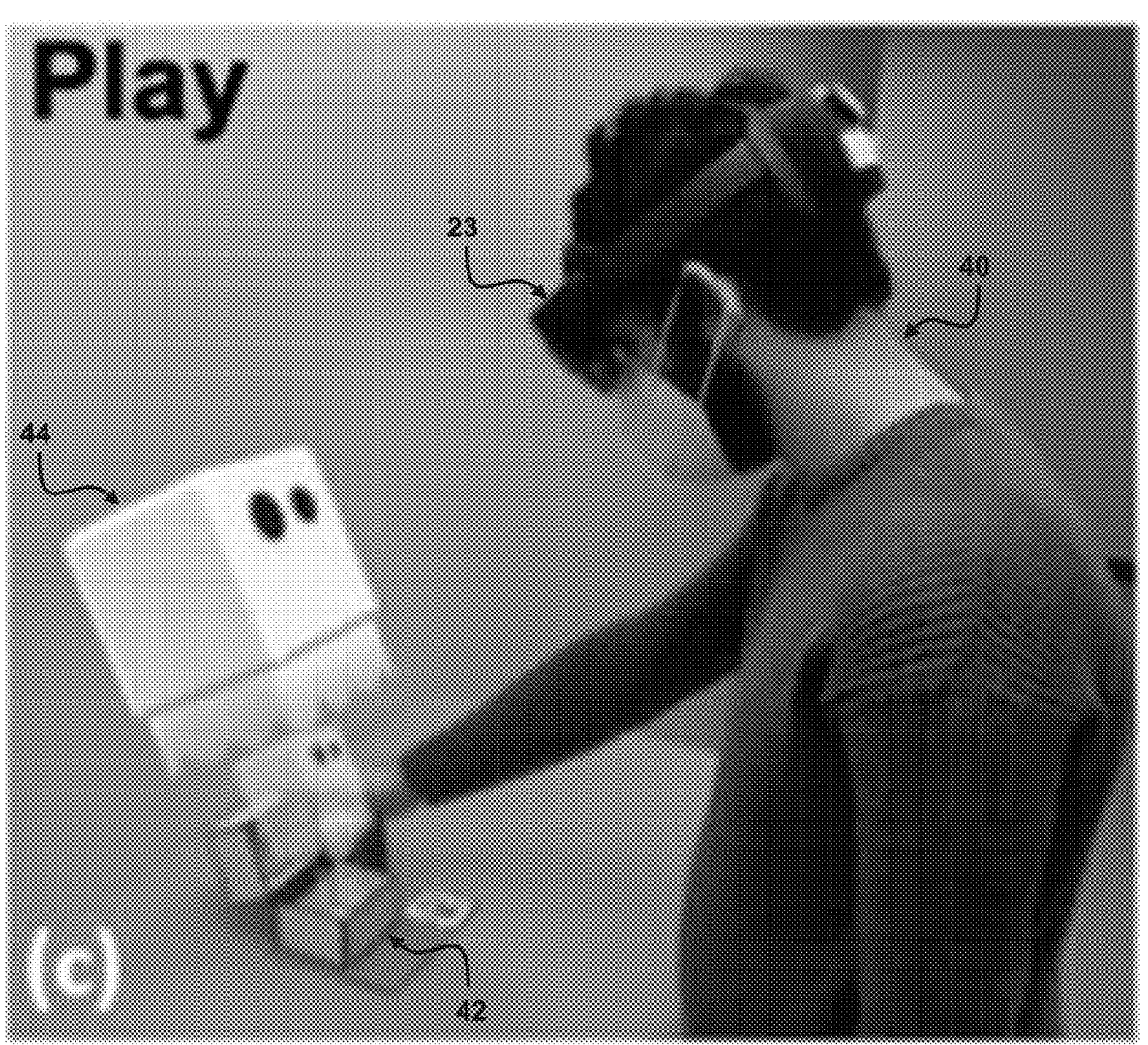

With reference to FIG. 1A-1C, an exemplary workflow the AR interaction authoring system 10 is illustrated. In an Import Mode, users can import physical and virtual content for usage in a visual programming interface of the AR interaction authoring system 10. For example, as shown in FIG. 1A, a user 40 starts with a physical toy chest 42. The physical toy chest 42 has been connected with a rotation module that is included as a part of the IoT toolkit such that the rotation module can sense and/or control opening and closing of the physical toy chest 42. Using an AR graphical user interface 46 provided by the AR-HMD 23, the user 40 imports the physical toy chest 42 into the programming workspace by defining a bounding box around it. Similarly, the user 40 imports a virtual ghost 44 into the programming workspace by selecting the three-dimensional model from a menu in the AR graphical user interface 46.

Next, in an Editor Mode, users can design and edit interactions between toys in the physical world and virtual content in AR. For example, as shown in FIG. 1B, using the AR graphical user interface 46, the user 40 authors an interaction between the virtual ghost 44 and the physical toy chest 42 using input-output and/or trigger-action programming metaphors. In particular, the user 40 defines an input of the interaction to be an opening of the physical toy chest 42, which is sensed by a rotation angle of the rotation module connected to the physical toy chest 42. This physical-world input is programmed by the user 40 demonstrating the opening of the physical toy chest 42. Additionally, the user 40 defines an output of the interaction to be the virtual ghost 44 'popping out' of the physical toy chest 42 (i.e., appearing and animating in the AR space above the physical toy chest 42). This virtual-world output is likewise programmed by the user 40 demonstrating an animation and/or manipulation of the virtual ghost 44. In this way, the user 40 has defined a physical-virtual interaction in which the virtual ghost 44 pops out from the physical toy chest 42 in response to the physical toy chest 42 being opened.

Finally, in a Play Mode, users can visualize the authored AR application. For example, as shown in FIG. 1C, the user 40 can play with the physical toy chest 42, which has been augmented by the user-defined AR interaction. Particularly, the user 40 opens the physical toy chest 42. The rotation module connected with the physical toy chest 42 senses that the physical toy chest 42 has been opened and communicates this to the AR system 20. The AR-HMD 23 displays in the AR graphical user interface 46, the virtual ghost 44 popping out of the physical toy chest 42 in response to the rotation module communicating to the AR system 20 that the physical toy chest 42 has been opened.

Exemplary IoT Toolkit

As noted above, the storytelling system includes an IoT toolkit 100 which enables the user to prototype interactive physical toys an AR-enhanced toy experience. With reference to FIGS. 2A-2C, exemplary components of the IoT toolkit 100 are described. As shown in FIG. 2A, the IoT toolkit 100 includes a plurality of plug-and-play modules 130A-H that can be controlled by the AR system 20. As shown in FIG. 2C, each plug-and-play module 130A-H is a standalone device having a microprocessor 114, memory 116, one or more communication devices 118, one or more input devices 120, one or more output devices 122, and a battery (not shown). The plug-and-play modules 130A-H enable a user to easily turn a traditional toy into an AR-enhanced toy.

The memory 116 is configured to store data and program instructions that, when executed by the processor 114, enable the plug-and-play module 130A-H to perform various operations described herein, including user-defined functions 132 in some embodiments. The memory 116 may be of any type of device capable of storing information accessible by the processor 114, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 114 may include a system with a central processing unit, graphics processing units, multiple processing units, dedicated circuitry for achieving functionality, programmable logic, or other processing systems.

The one or more communication devices 118 include transceivers, modems, or other communication devices configured to enable communications with various other devices, at least including the AR system 20 and/or the AR-HMD 23 for providing an AR-enhanced toy experience. Particularly, in at least one embodiment, the plug-and-play module 130A-H comprises a Wi-Fi module. The Wi-Fi module is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. Additionally, in at least one embodiment, the plug-and-play module 130A-H comprises a Bluetooth Low Energy (BLE) module. The BLE module is configured to enable direct communication with the AR device or other computing devices and includes at least one transceiver with a corresponding antenna, as well as any processors, memories, oscillators, or other hardware conventionally included in a BLE module. It will be appreciated, however, that other communication technologies, such as Z-Wave, Zigbee, or any other radio frequency-based communication technology can be used to enable data communications between the plug-and-play module 130A-H and the AR device or other computing devices.

FIG. 2B illustrates communication between the plug-and-play modules 130A-H and the AR system 20, in an exemplary embodiment. In the illustrated embodiment, the plug-and-play modules 130A-H are connected to the AR-HMD 23 via a server running the MQ Telemetry Transport (MQTT) protocol, which is a standard for IoT communications. This protocol is based on the publish-subscribe model. Advantageously, it means the user does not need to reconfigure the network whenever a new module is added, enabling a more spontaneous design process.

The one or more input devices 120 may include sensors such as angular rotations sensors, color sensors, pressure sensors, light sensors, and the like, as well as user interface devices, such as buttons, switches, knobs, and the like.

The one or more output devices 122 may include mechanical actuators such as electric motors, solenoids, linear actuators, and the like, as well as audio-visual output devices, such as display screens, speakers, lights, and the like.

With reference to FIG. 2A, an exemplary assortment of plug-and-play modules 130A-H are shown. The exemplary assortment of plug-and-play modules include a button module 130A, a switch module 130B, and a knob module 130C for facilitating user inputs. The button module 130A has a button that can be pressed to provide a physical-world discrete input that triggers an AR interaction. Likewise, the switch module 130B has a switch that can be pressed to provide a physical-world discrete input that triggers an AR interaction. Finally, the knob module 130C has a knob that can be rotated to provide a physical-world continuous input that triggers an AR interaction.

The exemplary assortment of plug-and-play modules further includes a linear actuator module 130D and a rotation module 130E for facilitating local movement. The linear actuator module 130D includes an electric motor configured to operate a rack and pinion to provide a linear translation motion. Similarly, the rotation module 130E includes an electric motor configured to provide a rotating motion. In each case, the electric motor may comprise a servo motor paired with a potentiometer or other suitable sensor configured to sense an angular position of the servo motor. The linear actuator module 130D and the rotation module 130E can be passively turned by the user to demonstrate a physical-world continuous input that triggers an AR interaction or to demonstrate a physical-world continuous output that is to be triggered by an AR interaction. During such a demonstration, the rotational positions of the servo are recorded, which makes programming by demonstration possible for input and outputs.

The exemplary assortment of plug-and-play modules includes a movement module 130F for facilitating global movement. The movement module 130F includes wheels, e.g., mechanum wheels, and electric motors configured to operate the wheels to enable movements along a surface. In at least some embodiments, the movement module 130F enables omnidirectional global movement along a surface.

Finally, the exemplary assortment of plug-and-play modules includes a haptic module 130G and a buzzer & light module 130H for providing sensor outputs. The haptic module 130G includes a haptic motor configured to provide haptic feedback (e.g., vibration, etc.). The buzzer & light module 130H includes a piezo sound buzzer configured to output an audible buzz and one or more lights configured to provide a visual indicator.

It should be appreciated that the plug-and-play modules 130A-H are merely exemplary and that the IoT toolkit 100 may include any assortment of modular electronic components. These plug-and-play modules 130A-H can be connected with, attached to, or otherwise integrated with physical toys to enable AR interactions to be designed with respect to the physical toys. As will be described in greater detail below, the plug-and-play module 130A-H can be easily programmed by the user using a visual programing environment to create one or more user-defined functions, operations, and/or actions that can be performed in conjunction with AR content.

Exemplary AR Interaction Authoring System

FIG. 3 shows exemplary components of an AR system 20 of the AR interaction authoring system 10. It should be appreciated that the components of the AR system 20 shown and described are merely exemplary and that the AR system 20 may comprise any alternative configuration. Moreover, in the illustration of FIG. 3, only a single AR system 20 is shown. However, in practice the AR interaction authoring system 10 may include one or multiple AR systems 20.

To enable the AR authoring environment, the AR interaction authoring system 10 at least includes an AR system 20, at least part of which is worn or held by a user. The AR system 20 preferably includes an AR-HMD 23 having at least a camera and a display screen, but may include any mobile AR device, such as, but not limited to, a smartphone, a tablet computer, a handheld camera, or the like having a display screen and a camera. In one example, the AR-HMD 23 is in the form of an AR or virtual reality headset (e.g., Microsoft's HoloLens, Oculus Rift, or Oculus Quest) or equivalent AR glasses having an integrated or attached front-facing stereo-camera 29 (e.g., ZED Dual 4MP Camera (720p, 60 fps)).

In the illustrated exemplary embodiment, the AR system 20 includes a processing system 21, the AR-HMD 23, and (optionally) external sensors (not shown). In some embodiments, the processing system 21 may comprise a discrete computer that is configured to communicate with the AR-HMD 23 via one or more wired or wireless connections. In some embodiments, the processing system 21 takes the form of a backpack computer connected to the AR-HMD 23.

However, in alternative embodiments, the processing system 21 is integrated with the AR-HMD 23. Moreover, the processing system 21 may incorporate server-side cloud processing systems.

As shown in FIG. 3, the processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices. Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the IoT devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

In the illustrated exemplary embodiment, the AR-HMD 23 comprises a display screen 28 and the camera 29. The camera 29 is configured to capture a plurality of images of the environment 50 as the head mounted AR device 23 is moved through the environment 50 by the user 15. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the AR-HMD 23 may further comprise a variety of sensors 30. In some embodiments, the sensors 30 include sensors configured to measure one or more accelerations and/or rotational rates of the AR-HMD 23. In one embodiment, the sensors 30 comprises one or more accelerometers configured to measure linear accelerations of the AR-HMD 23 along one or more axes (e.g., roll, pitch, and yaw axes) and/or one or more gyroscopes configured to measure rotational rates of the AR-HMD 23 along one or more axes (e.g., roll, pitch, and yaw axes). In some embodiments, the sensors 30 include Lidar or IR cameras. In some embodiments, the sensors 30 may include inside-out motion tracking sensors configured to track human body motion of the user within the environment, in particular positions and movements of the head, arms, and hands of the user.

The AR-HMD 23 may also include a battery or other power source (not shown) configured to power the various components within the AR-HMD 23, which may include the processing system 21, as mentioned above. In one embodiment, the battery of the AR-HMD 23 is a rechargeable battery configured to be charged when the AR-HMD 23 is connected to a battery charger configured for use with the AR-HMD 23.

The program instructions stored on the memory 26 include an AR interaction authoring program 33. As discussed in further detail below, the processor 25 is configured to execute the AR interaction authoring program 33 to enable authoring physical-virtual AR interactions. In one embodiment, the AR interaction authoring program 33 is implemented with the support of Microsoft Mixed Reality Toolkit (MRTK), Final IK, and mesh effect libraries 2 3 4. In one embodiment, the AR interaction authoring program 33 includes an AR graphics engine 34 (e.g., Unity3D engine), which provides an intuitive visual interface for the AR interaction authoring program 33. Particularly, the processor 25 is configured to execute the AR graphics engine 34 to superimpose on the display screen 28 graphical elements for the purpose of authoring AR interactions. In the case of a non-transparent display screen 28, the graphical elements may be superimposed on real-time images/video captured by the camera 29.

Interaction Framework

The AR interaction authoring system 10 enables interactions between AR content and physical toys that are scattered across the physical and virtual spaces, across time, and across different types of inputs and outputs. The AR interaction authoring system 10 enables the creation of bidirectional toy-AR interactions through trigger-action pairs. To simplify the authoring experience and minimize the learning curve, the AR interaction authoring system 10 adopts a trigger-action programming model. In this bidirectional interaction model, a physical object input can trigger the AR content actions and vice versa. To address this diversity, a unified framework is provided to categorize and classify AR interactions between a physical toy and AR content.

In this model, an interaction involves two components: (1) an input that is initiated by a subject and (2) an output that is generated by an object in response to the input. Both the subject and object can be virtual AR content or be a physical object. Thus, the joint interaction space can be classified into two types of interactions: Virtual-Physical interactions and Physical-Virtual interactions. Virtual-Physical interactions are those in which virtual content acts as input to trigger an output action of a physical device. Conversely, Physical-Virtual interactions are those in which a physical device acts as input to trigger an output action of virtual content. To further classify an AR interaction, different types of inputs and outputs can be categorized in a manner summarized in FIGS. 4A and 4B.

Figure 4A:
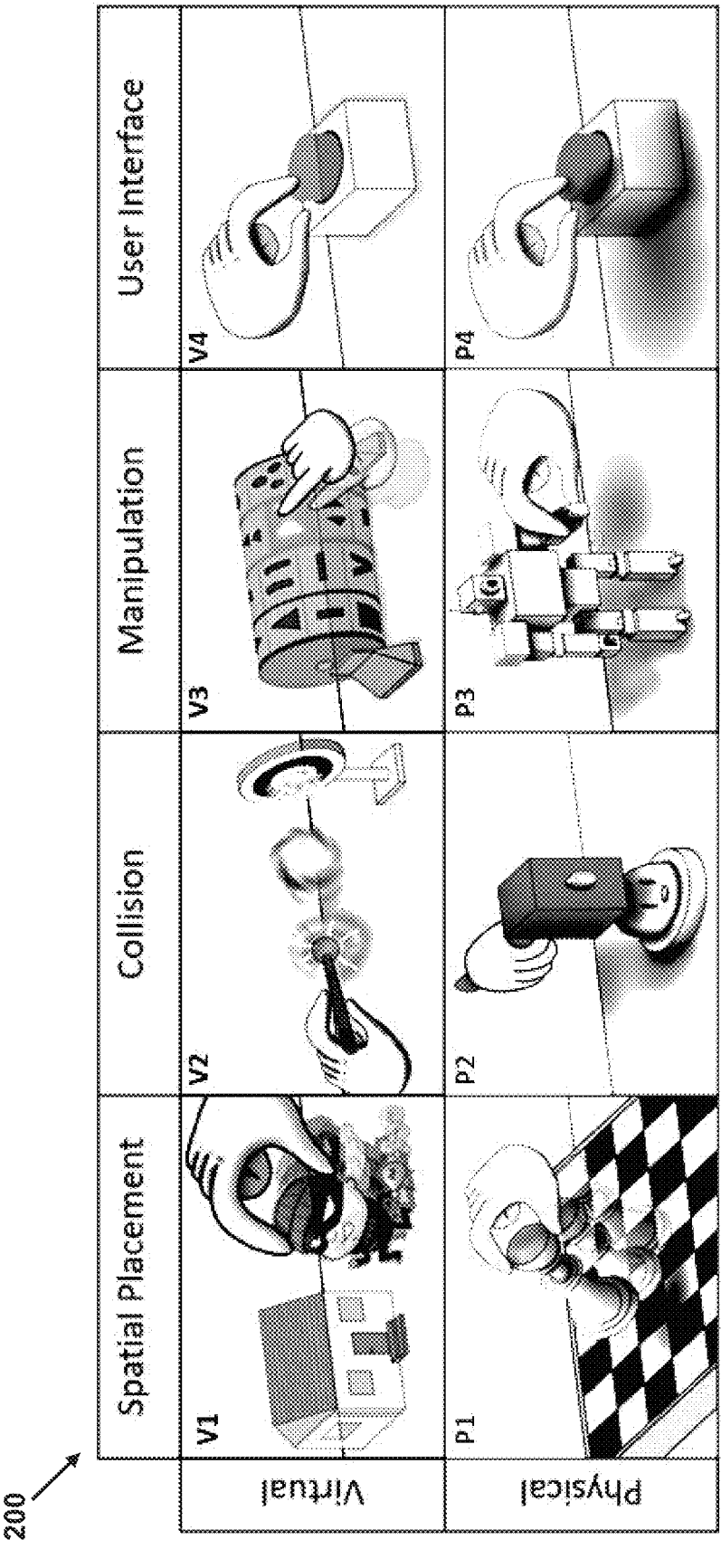
FIG. 4A shows a table summarizing an exemplary classification of input types for AR interactions.

FIG. 4A shows a table 200 summarizing an exemplary classification of input types for AR interactions. Each table cell depicts a single example but represents an entire class of input types for AR interactions. In the exemplary classification, input types can be classified into four input type classifications: Spatial Placement, Collision, Manipulation, and User Interface. Additionally, each input type classification can be either physical or virtual.

The spatial placement input type is illustrated in cells V1 and P1 of the table 200. The spatial placement input type describes inputs in which the user moves an object (physical or virtual) from one place to another. The cell P1 of the table 200 illustrates one example of a physical spatial movement input in which a physical board game piece is moved from one space on a game board to another space on the game board to progress the board game. Similarly, the cell V1 of the table 200 illustrates one example of a virtual spatial movement input in which a user places a virtual character near a house to progress an interactive storyline.

The collision input type is illustrated in cells V2 and P2 of the table 200. The collision input type describes inputs in which the user moves or controls an object (physical or virtual) to hit, collide, or intersect with another object (physical or virtual). The cell P2 of the table 200 illustrates one example of a physical collision input in which the user wields a physical hammer to smash a physical mole in a wack-a-mole game. Similarly, the cell V2 of the table 200 illustrates one example of a virtual collision input in which a user controls a virtual wand to cast a virtual fireball toward a virtual target.

The manipulation input type is illustrated in cells V3 and P3 of the table 200. The manipulation input type describes inputs in which users change an internal status or layout of an object (physical or virtual) or manipulate some part of the object relative to another part of the object, without moving it spatially within the environment. The cell P3 of the table 200 illustrates one example of a physical manipulation input in which the user moves arms of a toy robot to form different poses. It should be appreciated that the linear actuation module 130D and the rotation module 130E can be leveraged to detect a physical manipulation input. Similarly, the cell V3 of the table 200 illustrates one example of a virtual manipulation input the user manipulates a virtual combination lock set a lock code.

Finally, the user interface input type is illustrated in cells V4 and P4 of the table 200. The user interface input type describes inputs in which a user interface element (physical or virtual), such as a button, switch, or knob is used to provide an input. The cell P4 of the table 200 illustrates one example of a physical user interface input in which the user presses a physical button. It should be appreciated that the button module 130A, the switch module 130B, and the knob module 130C can be leveraged to enable physical user interface input. Similarly, the cell V4 of the table 200 illustrates one example of a virtual user interface input the user presses a virtual button.

Figure 4B:
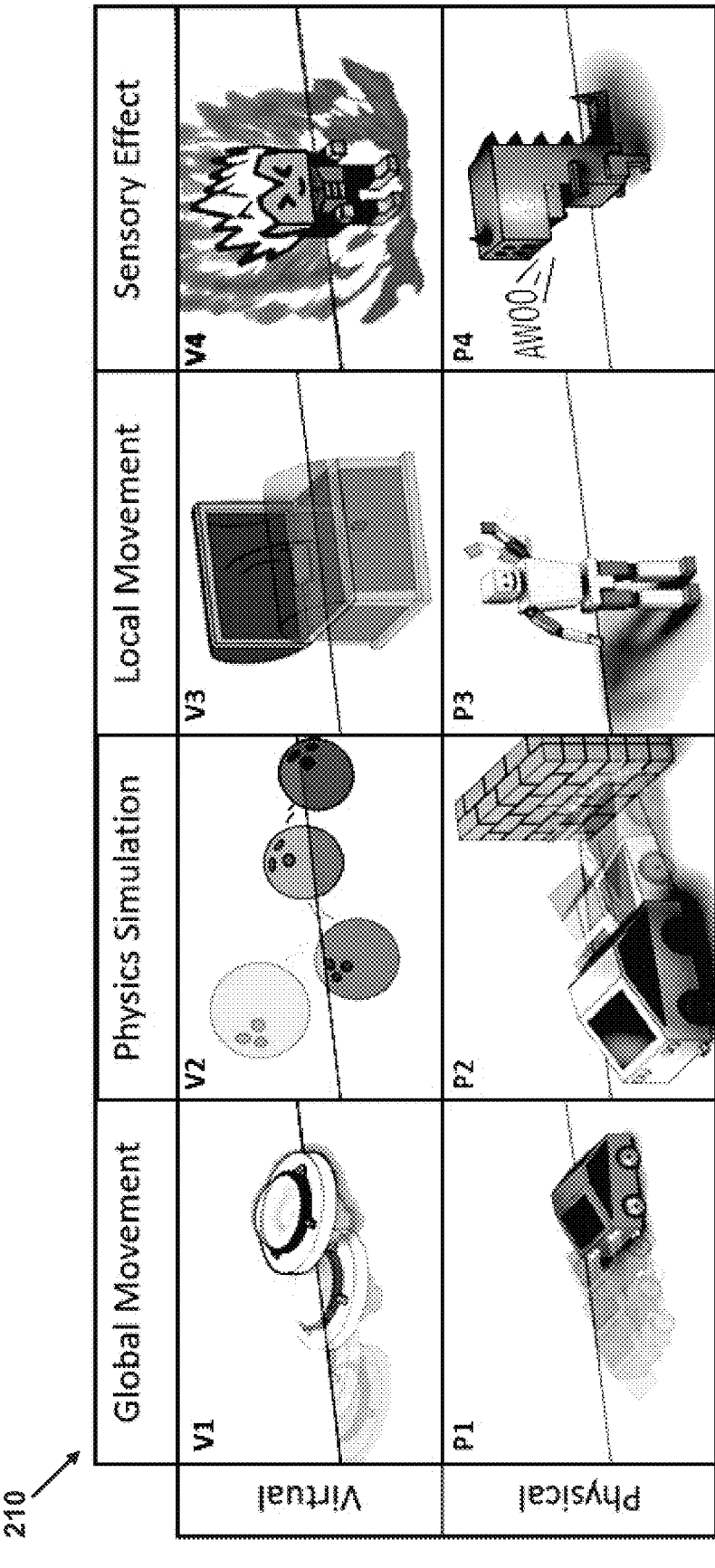
FIG. 4B shows a table summarizing an exemplary classification of output types for AR interactions.

FIG. 4B shows a table 210 summarizing an exemplary classification of output types for AR interactions. Each table cell depicts a single example but represents an entire class of output types for AR interactions. In the exemplary classification, output types can be classified into four output type classifications: Global Movement, Physics Simulation, Local Movement, and Sensory Effect. Additionally, each output type classification can be either physical or virtual.

The global movement output type is illustrated in cells V1 and P1 of the table 210. The global movement output type describes outputs in which an object (physical or virtual) moves from one place to another, which may be along a trajectory defined by the user. The cell P1 of the table 210 illustrates one example of a physical global movement output in which a physical remote-controlled car moves along a surface in an environment in a manner defined by the user. It should be appreciated that the movement module 130F can be leveraged to implement a physical global movement output. Similarly, the cell V1 of the table 210 illustrates one example of a virtual global movement output in which a virtual space ship moves throughout an environment along a trajectory defined by the user.

The physics simulation output type is illustrated in cells V2 and P2 of the table 210. The physics simulation output type describes outputs in which an object (physical or virtual) moves from one place to another along a trajectory that is not defined by the user but, instead, in accordance with the laws of physics. This provides a more realistic experience for users. The cell P2 of the table 210 illustrates one example of a physical physics simulation output in which a physical remote-controlled car moves along a physical surface of an environment and is automatically stopped and bounces backward when it reaches a location of a virtual wall. In this way, movements of a virtual object accurately depict interactions with the physical environment. Similarly, the cell V2 of the table 210 illustrates one example of a virtual physics simulation output in which a virtual bowling ball bounces along a physical surface of the environment. In this way, movements of a physical object accurately depict interactions with the virtual environment.

The local movement output type is illustrated in cells V3 and P3 of the table 210. The local movement output type describes outputs in which some part of an object (physical or virtual) moves relative another part of the object or an internal status or layout of the object changes, but the object as a whole does not necessarily move through the environment. The cell P3 of the table 210 illustrates one example of a physical local movement output in which a physical robot toy raises its arm (e.g., to wave). It should be appreciated that the linear actuation module 130D and the rotation module 130E can be leveraged to implement a physical local movement output. Similarly, the cell V3 of the table 210 illustrates one example of a virtual local movement output in which a virtual chest opens.

The sensory effect output type is illustrated in cells V4 and P4 of the table 210. The sensory effect output type describes outputs in which a perceptible sensor output is provided, such as audible sounds, visible outputs, or tactile feedback. The cell P4 of the table 210 illustrates one example of a physical sensory effect output in which a toy dinosaur makes a sound. It should be appreciated that the haptic module 130G and the buzzer & light module 130H can be leveraged to implement a physical sensory effect output. Similarly, the cell V4 of the table 210 illustrates one example of a virtual sensory effect output in which virtual character is animated with a visual effect that cannot be perceived in the real world.

Finally, a trigger-action type of the AR interactions can be further classified as: Discrete Trigger-Actions and Continuous Trigger-Actions. Discrete trigger-actions are those in which, in response to a defined trigger event occurring (e.g., button being pressed), an output action is activated (e.g., a chest is opened). In contrast, a continuous trigger-actions are those in which a continuous or analog relationship is defined between an input parameter (e.g., a physical or virtual knob's value) and an output parameter (e.g., an opening angle of a chest). In response to the input parameter having a particular value, the output parameter takes on a corresponding value. Thus, it should be appreciated that the trigger-action type is determined based on the mapping from input to output.

Figure 4C:
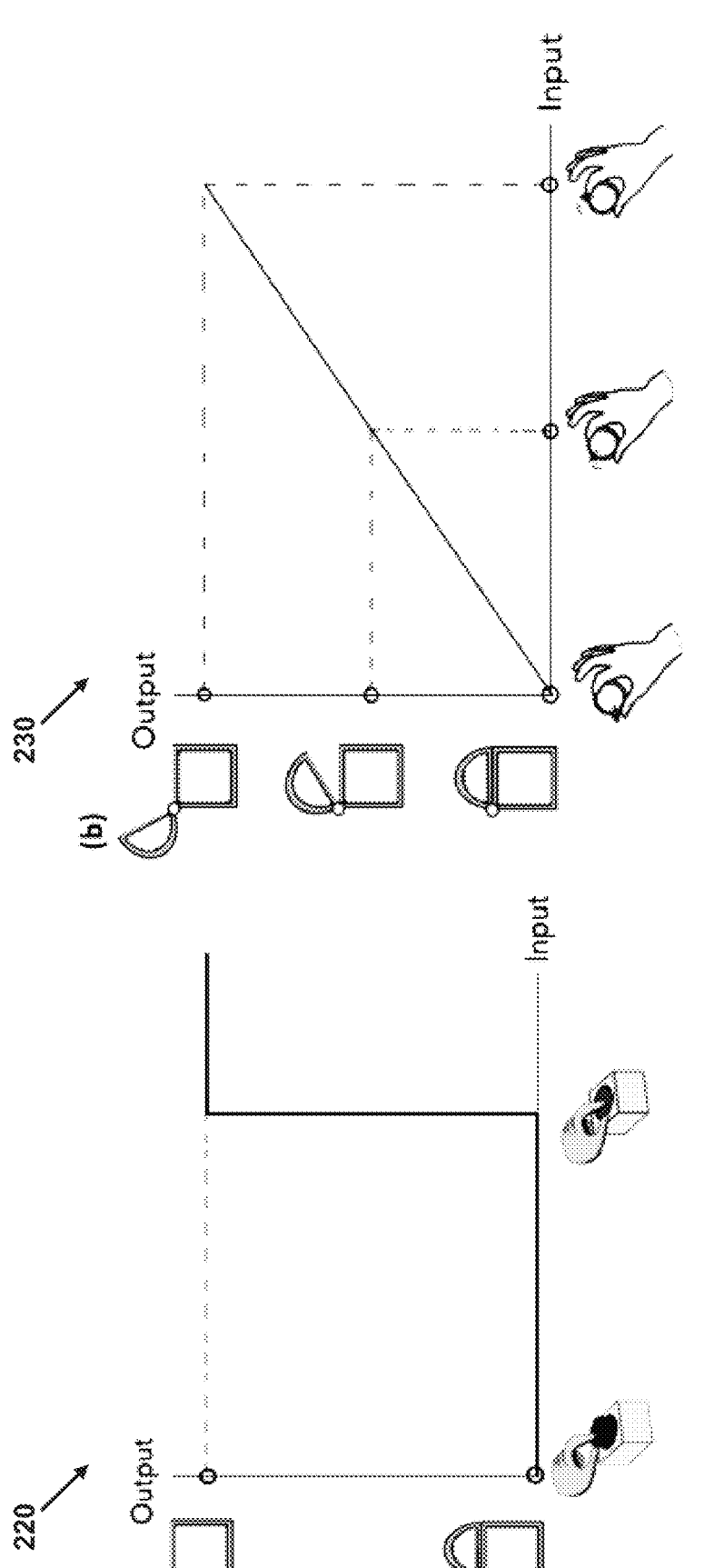
FIG. 4C shows two plots comparing the input-output mapping of a discrete trigger-action with the input-output mapping of a continuous trigger-action.

FIG. 4C shows two plots comparing the input-output mapping of a discrete trigger-action with the input-output mapping of a continuous trigger-action. The plot 220 shows the discrete or discontinuous relationship between the input and the output of a discrete trigger-action. In such interactions, the inputs and outputs are considered to take on only limited set of discrete states or statuses. In the illustrated example, when a button is in an unpressed state, a chest is in closed state. However, when a button is in a pressed state, a chest is in a fully open state. In contrast, a plot 230 shows the continuous relationship between the input and the output of a continuous trigger-action. In such interactions, the inputs and outputs can take on continuous set of possible states or statuses that are mapped from input to output. In the illustrated example, when a knob is in rotated to any arbitrary position, the lid of the chest opens at an angle that directly corresponds to the arbitrary position of the knob.

In summary, the interaction framework of the AR interaction authoring system 10 consists of three dimensions: (i) an input trigger, (ii) an output action, and (iii) a trigger-action type. Each AR interaction can be characterized by these three dimensions. Later in the description, the extensiveness of this framework will be demonstrated with illustrative use cases. For clear reference back to this framework, the description will encode each interaction with the combination of elements from this framework.

Methods for Authoring AR Interactions

A variety of methods, workflows, and processes are described below for enabling the operations and interactions of the AR system 20. In these descriptions, statements that a method, workflow, processor, and/or system is performing some task or function refers to a controller or processor (e.g., the processor 25) executing programmed instructions (e.g., the AR interaction authoring program 33, the AR graphics engine 34) stored in non-transitory computer readable storage media (e.g., the memory 26) operatively connected to the controller or processor to manipulate data or to operate one or more components in the AR interaction authoring system 10 to perform the task or function. Additionally, the steps of the methods may be performed in any feasible chronological order, regardless of the order shown in the figures or the order in which the steps are described.

Additionally, various AR graphical user interfaces are described for operating the AR system 20. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the sensors 30 and the camera 29, so as to simulate the presence of the graphical elements in the real-world environment. However, it will be appreciated by those of ordinary skill in the art that, in many cases, an equivalent non-AR graphical user interface can also be used to operate the AR interaction authoring program 33, such as a user interface provided on a further computing device such as a laptop computer, a tablet computer, a desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example via gestures performed in view of the one of the camera 29 or other sensor, and execute instructions of the AR interaction authoring program 33 to perform some operation in response to the user inputs.

Finally, various forms of motion tracking are described in which spatial positions and motions of the user or of other objects in the environment are tracked. In order to provide this tracking of spatial positions and motions, the processor 25 executes instructions of the AR interaction authoring program 33 to receive and process sensor data from any suitable combination of the sensors 30 and the camera 29, and may optionally utilize visual and/or visual-inertial odometry methods such as simultaneous localization and mapping (SLAM) techniques.

FIG. 5 shows a flow diagram for a method 300 for providing an AR-enhanced toy experience. The method 300 enables the user to easily augment his or her toys with interactivity between the physical and virtual spaces, using a trigger-action framework and intuitive visual programming environment. Once AR interactions are defined, the method 300 utilizes the AR system 20 to bring the physical toys to life to provide an AR-enhanced play experience.

The method 300 begins with providing plug-and-play module(s) in an environment of a user and constructing AR-enhanced objects by integrating the plug-and-play module(s) with physical objects (block 302). Particularly, in at least some embodiments, an assortment of plug-and-play modules 130A-H are provided to the user. As discussed above, these plug-and-play modules 130A-H are configured to enable a variety of different input triggers and output actions for providing an AR-enhanced toy experience. The plug-and-play modules 130A-H are configured to easily pair with and communicate with the AR system 20 to enable additional functionalities to the physical toys or to the environment. In at least some embodiments, the one or more of the plug-and-play modules 130A-H can be directly connected with, attached to, or otherwise integrated with physical toys to enable AR interactions to be designed with respect to the physical toys and, thus, provide such additional functionalities to the physical toy.

Figure 6A:
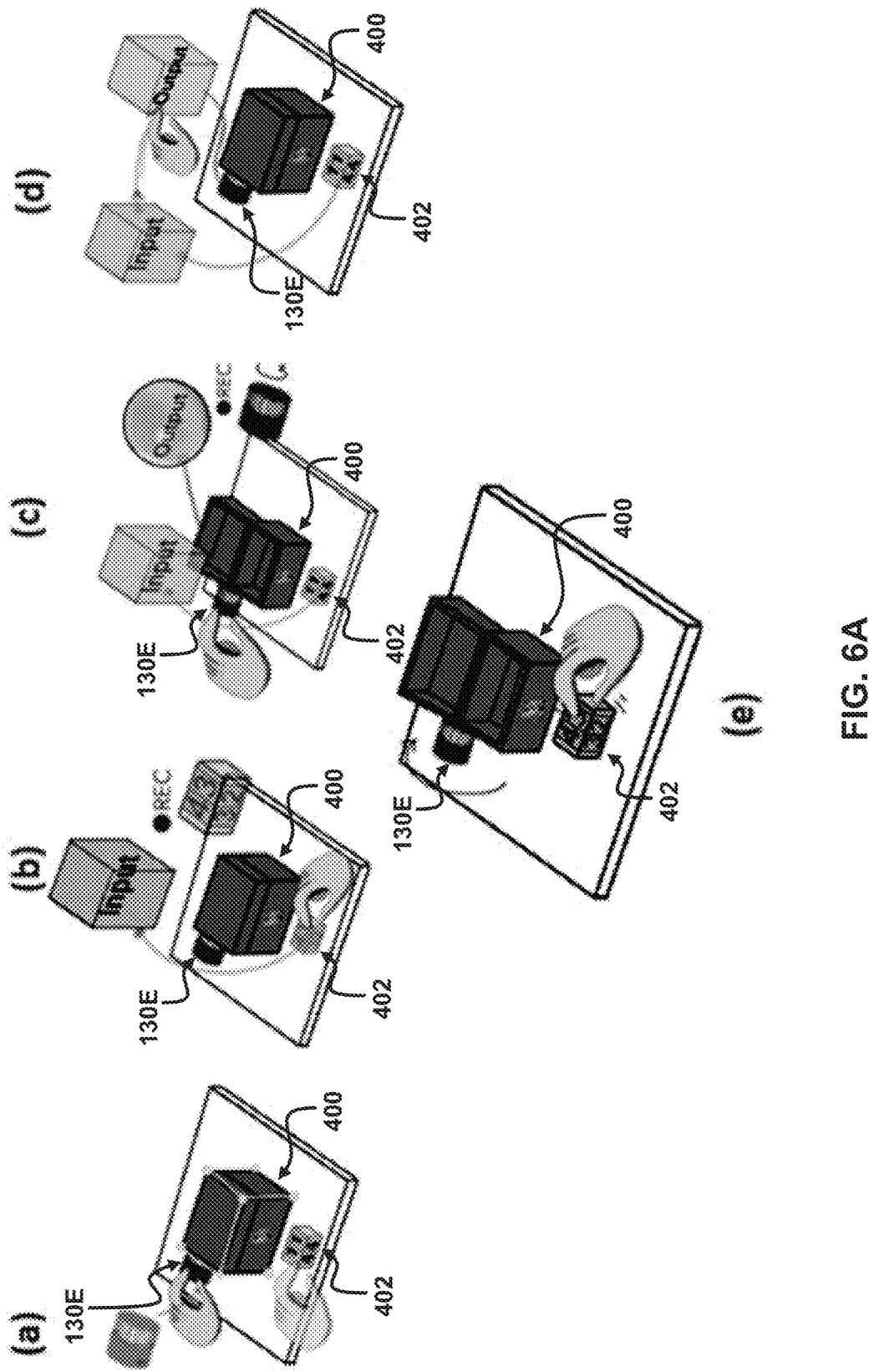
FIG. 6A shows a first exemplary AR interaction in which a virtual lock can be manipulated by a user to automatically open a physical chest.
Figure 6B:
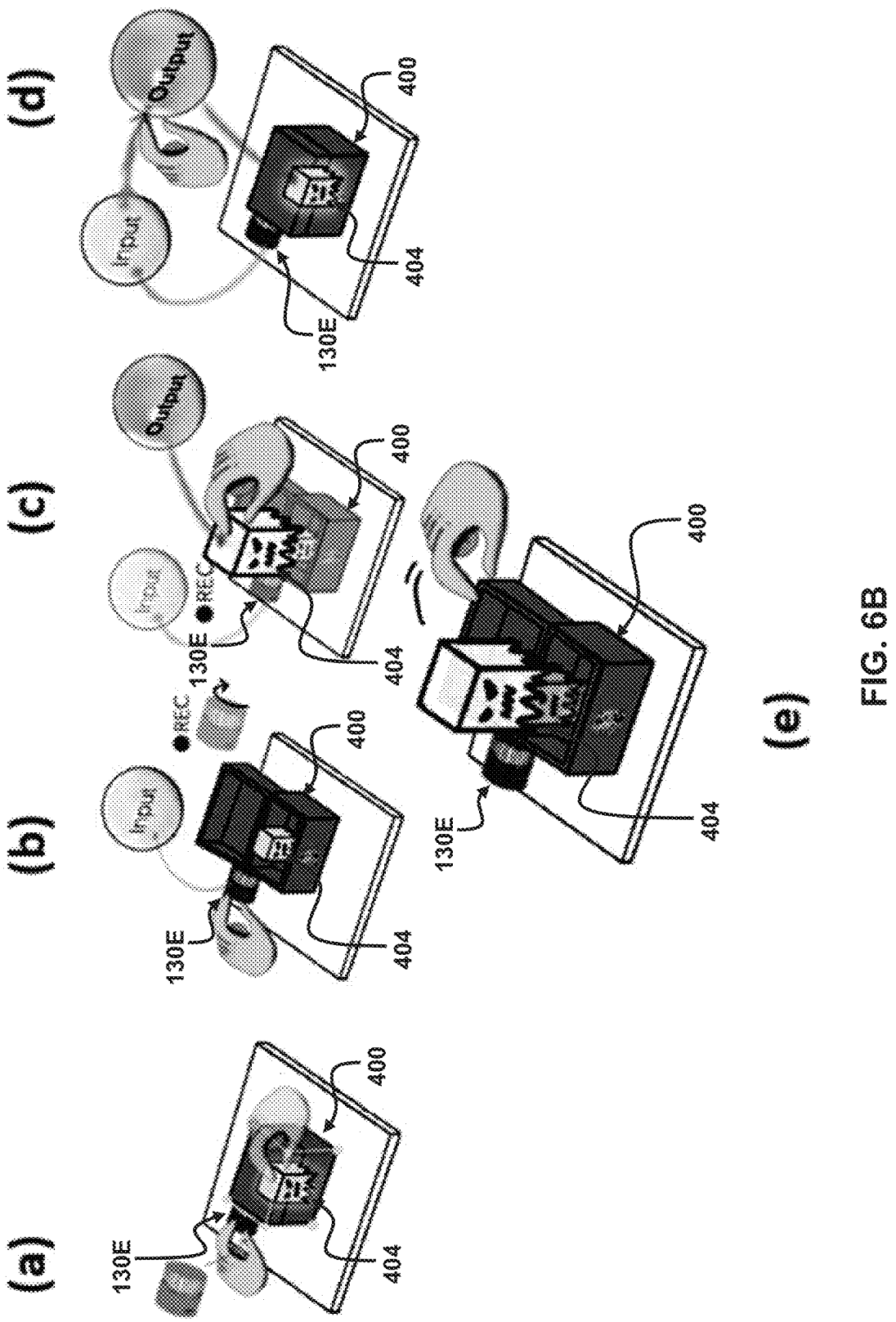
FIG. 6B shows a second exemplary AR interaction in which a virtual ghost pops out of a physical chest when manually opened by the user.

FIGS. 6A and 6B illustrate the design and programming workflows for two exemplary AR-enhanced toy experiences. Particularly, FIG. 6A shows a first exemplary AR interaction in which a virtual lock 402 can be manipulated by a user to automatically open a physical chest 400. Similarly, FIG. 6B shows a second exemplary AR interaction in which a virtual ghost 404 pops out of a physical chest 400 when a user manually opens the physical chest 400 and, likewise, disappears back into the physical chest 400 when the user manually closes the physical chest 400. To enable both exemplary interactions, the user attaches the rotation module 130E to a rotatable hinge of the physical chest 400, as shown in illustrations (a) of both FIG. 6A and FIG. 6B.

The method 300 continues with pairing an AR device to the plug-and-play module(s) arranged in the environment (block 304). Particularly, the processor 25 of the AR system 20 operates a transceiver, such as the Wi-Fi module 27, to communicatively pair with the communication device 118 of each plug-and-play modules 130A-H. In this way, the plug-and-play modules 130A-H and the AR system 20 can communicate to enable the user to design AR interactions and to provide an AR-enhanced play experience.

The method 300 continues with displaying an AR graphical user interface including a visual programming interface (block 306). Next, processor 25 executes the AR interaction authoring application 33 to display an AR graphical user interface on the display 28, via which the user can design AR interactions. To this end, the AR graphical user interface includes a variety of visual programming interfaces and provides interactions therewith which can be accessed in the following three modes of the AR system 20: Import Mode, Editor Mode, and Play Mode. As shown in FIG. 1A, in the Import Mode, users can import physical and virtual content for usage in the design of AR interactions. As shown in FIG. 1B, in the Editor Mode, users to design and edit AR interactions, as shown in FIG. 1B. Finally, as shown in FIG. 1C, in the Play Mode, users can visualize the authored AR application.

The method 300 continues with importing physical objects and virtual content into the visual programming interface (block 308). Particularly, within the AR graphical user interface, the user can identify physical objects in the environment that will be used to design AR interactions. Particularly, based on user inputs, the processor 25 defines a virtual bounding box for each physical object in the environment that is to be used to design AR interactions. Likewise, the user can identify virtual content, such as virtual objects, that will be used to design AR interactions. Particularly, based on user inputs, the processor 25 selects one or more virtual contents or virtual objects to be used to design AR interactions. After selection, the processor 25 operates the display 28 to display the selected virtual contents or virtual objects superimposed upon the environment within the AR graphical user interface.

With reference again to FIG. 6A, in illustration (a), the user imports virtual and physical content in the Import Mode. Particularly, the user imports the virtual asset (e.g., 3D model) of the virtual lock 402 by selecting it from a virtual content library and anchors it's position relative to the physical chest 400. Meanwhile, the user imports a model of the physical chest 400 into the AR workspace by creating bounding a box around the physical chest 400 that roughly fits its size. Finally, the user also imports the rotation module 130E by selecting it from a plug-and-play module library and anchoring its position relative to the physical chest 400. With reference to FIG. 6B, the user imports the virtual ghost 404 in the Import Mode in a similar manner as the virtual lock 402.

Figure 7A:
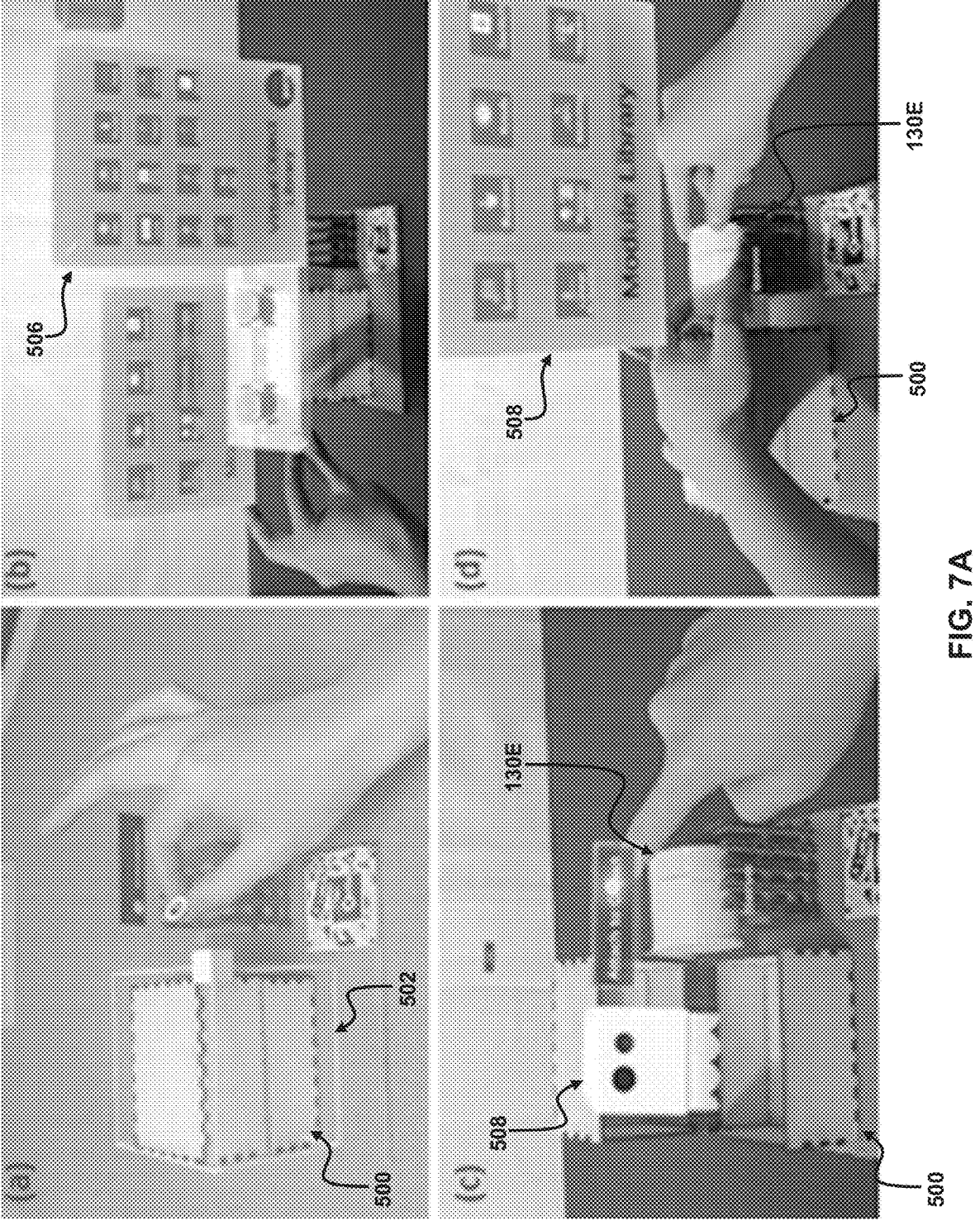
FIG. 7A shows exemplary AR graphical user interfaces of the Import Mode.

FIG. 7A shows exemplary AR graphical user interfaces of the Import Mode. As shown in illustration (a), to import a toy chest 500 to the scene, the user attaches a marker around the toy chest 500 and defines its bounding box 502. As shown in illustration (b), to import virtual content, such as a virtual ghost 504 the user first selects it from a virtual content library menu 506, which includes a variety of pre-created virtual models. Then, as shown in illustration (c), the user may anchor the virtual content to a physical object, such as the toy chest 500. This step is optional as the virtual content can be independent and does not always follow the movement of any physical object. Finally, as shown in illustration (d), if a plug-and-play module, such as the rotation module 130E, is attached to a physical object, such as the toy chest 500, the user manually registers that information by selecting the hardware module from a plug-and-play module library menu 508.

The method 300 continues with defining input trigger(s), each input trigger being characterized by a state of (i) a physical object in an environment of a user or (ii) a virtual object in an AR graphical user interface on an AR device (block 310). Particularly, the processor 25 defines, based on user inputs received via the AR system 20, one or more input triggers that can be used to define AR interactions. As discussed in greater detail above, input triggers can be physical input triggers or virtual input triggers.

Each virtual input trigger is characterized by a virtual state of a respective virtual object in the AR graphical user interface. For example, the virtual state of the respective virtual object that characterizes the virtual input trigger can include one or more of (i) a spatial position of the respective virtual object, (ii) a pose of a manipulable part of the virtual object, (iii) a collision of the respective virtual object with a respective physical object, (iv) a collision of the respective virtual object with a further virtual object in the AR graphical user interface, and (v) an interaction of the user with the respective virtual object. The different classifications of virtual input triggers are discussed above in greater detail with respect to FIG. 4A.

In at least some embodiments, the virtual state that characterizes a virtual input trigger is defined by the user demonstrating the virtual input trigger by virtually manipulating the respective virtual object. Particularly, in the case of a virtual input trigger, the processor 25 records values of the virtual state of the respective virtual object as the user demonstrates the virtual input trigger by virtually manipulating the respective virtual object in the augmented reality user interface. Next, the processor 25 defines values of the virtual state that characterize the virtual input trigger based on the recorded values of the virtual state during the user demonstrating the virtual input trigger.

With reference again to FIG. 6A, in the Editor Mode, the user selects "Manipulation Input Discrete" in the visual programming interface and records a demonstration of the virtual input trigger. Particularly, in illustration (b), the user demonstrates an input trigger with respect to a virtual state of the virtual lock 402 by virtually manipulating dials of the virtual lock 402 to set a lock code.

Each physical input trigger is characterized by a physical state of a respective physical object in the environment of the user. For example, the physical state of the respective physical object that characterizes a physical input trigger can include one or more of (i) a spatial position of the respective physical object, (ii) a pose of a manipulable part of the respective physical object, (iii) a collision of the respective physical object with a further physical object, (iv) a collision or intersection of the respective physical object with a virtual object in the augmented reality user interface, and (v) an interaction of the user with the respective physical object. The different classifications of physical input triggers are discussed above in greater detail with respect to FIG. 4A.

In at least some embodiments, the physical state that characterizes a physical input trigger is defined by the user demonstrating the physical input trigger by physically manipulating the respective physical object. Particularly, in the case of a physical input trigger, at least one sensor measures values of the physical state of the respective physical object as the user demonstrates the physical input trigger by physically manipulating the respective physical object. Next, the processor 25 defines values of the physical state that characterize the physical input trigger based on the measured values of the physical state during the user demonstrating the physical input trigger. The at least one sensor may comprise, for example, a sensor integrated into one of the plug-and-play modules that is attached to the respective physical object. Likewise, the at least one sensor may include the camera 29 of the AR-HMD 23 that helps to measure a spatial position of the respective physical object.

With reference again to FIG. 6B, in the Editor Mode, the user selects "Manipulation Input Continuous" in the visual programming interface and records a demonstration of the physical input trigger. Particularly, in illustration (b), the user demonstrates an input trigger with respect to a physical state of the physical chest 400 by physically manipulating the lid of the physical chest. The attached rotation module 130E records the angles of rotation of the lid of the physical chest 400 (at least starting and final values) as the user demonstrates the opening of the physical chest 400.

Figure 7B:
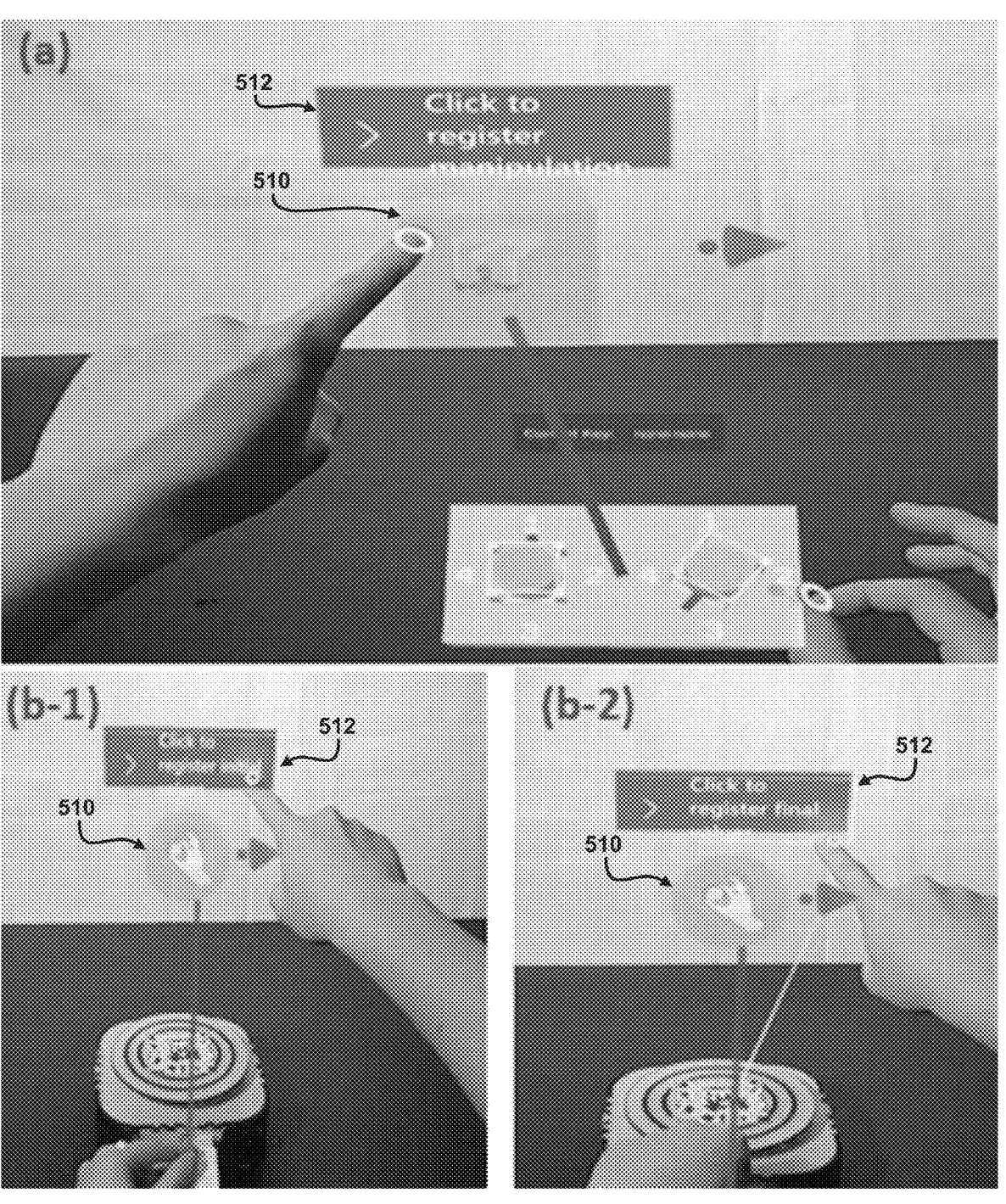
FIG. 7B shows exemplary AR graphical user interfaces of the Editor Mode for demonstrating behaviors for discrete inputs and continuous inputs.

FIG. 7B shows exemplary AR graphical user interfaces of the Editor Mode for demonstrating behaviors for discrete inputs and continuous inputs. As discussed above, the AR interaction authoring system 10 enables users to demonstrate four types of input triggers: spatial placement, collision, manipulation, and user interface. Except for collision, the other three types of input trigger can be both discrete and continuous. The user demonstrates the input trigger, by first dragging out a corresponding input node 510 of the visual programming interface and connecting it to the associated object. For collision input triggers and spatial placement input triggers, which involve the interaction between two things, the user draws another connection between the objects in the visual programming interface. Except for the collision input, which does not leave room for customization, the user defines the input behaviors explicitly by demonstration. In the illustrated embodiment, in the visual programming interface, the input type is represented visually with a sphere (continuous) or a square (discrete). Illustration (a) shows a user defining the state for a discrete input trigger. Particularly, to define a discrete input trigger, the user only needs to manipulate the object to its desired state and click the button 512 to register the state that characterizes the input trigger. However, to define a continuous input trigger, the user needs to register both a starting state and a final state that characterize the continuous trigger input. As shown in illustration (b-1), the user first moves the object (e.g., a knob) to the starting state and clicks the button 512 to register the starting state. Next, as shown in illustration (b-2), the user moves the object to the final status and clicks the button 512 to register the final state. The processor 25 linearly derives a series of values between the starting state and the final state (e.g., knob values in the range between two positions).

The method 300 continues with defining output action(s), each output action being characterized by a state of (i) a physical object in the environment of the user or (ii) virtual content in the AR graphical user interface on the AR device (block 312). Particularly, the processor 25 defines, based on user inputs received via the AR system 20, one or more output actions that can be used to define AR interactions. As discussed in greater detail above, output actions can be physical output actions or virtual output actions.

Each physical output action is characterized by a physical state of a respective physical object in the environment of the user. For example, the physical state of the respective physical object that characterizes a physical output action can include one or more of (i) a movement of the respective physical object according to a user-defined trajectory, (ii) a movement of a part of the respective physical object, (iii) a movement of the respective physical object according to a physics-based trajectory, and (iv) a perceptible sensory effect output by the respective physical object. The different classifications of physical output actions are discussed above in greater detail with respect to FIG. 4B.

In at least some embodiments, the physical state that characterizes a physical output action is defined by the user demonstrating the physical output action by physically manipulating the respective physical object. Particularly, in the case of a physical output action, at least one sensor measures values of the physical state of the respective physical object as the user demonstrates the physical output action by physically manipulating the respective physical object. Next, the processor 25 defines values of the physical state that characterize the physical output action based on the measured values of the physical state during the user demonstrating the physical output action. The at least one sensor may comprise, for example, a sensor integrated into one of the plug-and-play modules that is attached to the respective physical object. Likewise, the at least one sensor may include the camera 29 of the AR-HMD 23 that helps to measure a spatial position of the respective physical object.

With reference again to FIG. 6A, in the Editor Mode, the user selects "Local Movement" in the visual programming interface and records a demonstration of the physical output action. Particularly, in illustration (c), the user demonstrates an output action with respect to a physical state of the physical chest 400 by physically manipulating the lid of the physical chest. The attached rotation module 130E records the angles of rotation of the lid of the physical chest 400 (at least starting and final values) as the user demonstrates the opening of the physical chest 400.

Each virtual output action is characterized by a virtual state of virtual content to be displayed via the augmented reality device. For example, the virtual state of the respective virtual object that characterizes a virtual output action can include one or more of (i) a movement of the respective virtual object according to a user-defined trajectory, (ii) a movement of a part of the respective virtual object, (iii) a movement of the respective virtual object according to a physics-based trajectory, and (iv) a visual effect superimposed upon the environment or a respective physical object. The different classifications of virtual output actions are discussed above in greater detail with respect to FIG. 4B.

In at least some embodiments, the virtual state that characterizes a virtual output action is defined by the user demonstrating the virtual output action by virtually manipulating the respective virtual object. Particularly, in the case of a virtual output action, the processor 25 records values of the virtual state of the respective virtual object as the user demonstrates the virtual output action by virtually manipulating the respective virtual object in the augmented reality user interface. Next, the processor 25 defines values of the virtual state that characterize the virtual output action based on the recorded values of the virtual state during the user demonstrating the virtual output action.

With reference again to FIG. 6B, in the Editor Mode, the user selects "Global Movement" in the visual programming interface and records a demonstration of the virtual output action. Particularly, in illustration (c), the user demonstrates an output action with respect to a virtual state of the virtual ghost 404 by virtually manipulating the virtual ghost 404 to move upward out of the chest while also increasing in size, at least registering starting and final states of the size and position of the virtual ghost 404.

FIG. 7C shows exemplary AR graphical user interfaces of the Editor Mode for demonstrating output movements by direct manipulation of an object. As discussed above, the AR interaction authoring system 10 enables users to demonstrate four types of output: global movement, local movement, sensory effect, and physics simulation. Both local movement and global movement are sequences of positions or poses of an object. Accordingly, both local movement and global movement can be demonstrated by the user directly by physically or virtually moving, rotating, or scaling the object. The user demonstrates the output action by first dragging out a corresponding output node 514 of the visual programming interface and connecting it to the associated object. In the illustration (a), the user clicks a start recording button 516 and starts virtually manipulating a virtual rocket 518. In the illustration (b), the user virtually manipulates the virtual rocket 518 to define starting and final states for the output action. Once finished, the user clicks the stop recording button 520 and can click the play button 522 to preview the recorded output action. Similarly, the user can adjust a preview slider 524 to further preview the recorded output action. Finally, the user can click the reset button 526 to start over with the recording process.

FIG. 7D shows exemplary AR graphical user interfaces of the Editor Mode for demonstrating a sensory effect output action. The sensory effect library includes several common sensory outputs. Most of them have one or several parameters available for customization purposes. In the illustrated example, a projectile visual effect is applied to a virtual shooting star 528. The visual effect can be customized in size, speed, amount, and gravity. As shown in illustrations, the user sets a starting and final state of this effect by changing its parameters using sliders 530 in the visual programming interface. The "1" and "2" on the sliders represent parameter values at for the starting state and final state of the output action, respectively. By adjusting the parameter value for the starting state and final state, the user defines the sequence of events for output action. It should be appreciated, however, that some sensory effects, such as a mesh explosion, can happen momentarily and do not allow users to set a starting state and final state. As a result, they can only be connected to discrete input. Finally, for the physics simulation output action, the user does not have any room for customization, so the output behavior is determined by the collision input physics in real-time.

The method 300 continues with pairing at least one input trigger with at least one output action to define at least one AR interaction (block 314). Particularly, the processor 25 pairs at least one input trigger with at least one output action, based on user inputs provided via a visual programming interface of the AR graphical user interface. It should be appreciated that a virtual input trigger can be paired with a physical output action to form a Virtual-Physical AR interaction or a physical input trigger can be paired with a virtual output action to form a Physical-Virtual AR interaction. In at least some embodiments, to enlarge the interaction space, the AR interaction authoring system 10 further allows users to pair a physical input trigger with physical output action to form a Physical-Physical interaction or pair a virtual input trigger with a virtual output action to form a Virtual-Virtual interaction. However, these variations are not discussed in detail herein.

With reference again to FIG. 6A, in the Editor Mode, the user connects an input trigger to an output action to define a Virtual-Physical AR interaction. Particularly, in illustration (d), the user forms an AR interaction by connecting the local manipulation virtual input trigger (i.e., manipulation of the virtual lock 402) to the local movement physical output action (i.e., opening of the physical chest 400) to form a discrete trigger-action type of Virtual-Physical AR interaction.

With reference again to FIG. 6B, in the Editor Mode, the user connects an input trigger to an output action to define a Physical-Virtual AR interaction. Particularly, in illustration (d), the user forms an AR interaction by connecting the local manipulation physical input trigger (i.e., opening or closing of the physical chest 400) to the global movement virtual output action (i.e., appearance, movement, and scaling of the virtual ghost 404) to form a continuous trigger-action type of Physical-Virtual AR interaction.

FIG. 7E shows exemplary AR graphical user interfaces of the Editor Mode for establishing connections between input triggers and output actions. Particularly, the last step of the authoring process is to connect at least one input trigger with at least one output action, which can be done simply through a drag-and-drop approach. In the illustration (a), the user connects 532 a discrete input trigger node 534 to an output action node 536, which automatically changes output action node 536 to a square shape, and defines an AR interaction having a discrete trigger-action type. In the illustration (b), the user connects 538 a continuous input trigger node 540 to an output action node 542, which retains a sphere shape, and defines an AR interaction having a continuous trigger-action type.

It should be appreciated that certain types of input triggers and output actions may inherently take the form an AR interaction of the discrete trigger-action type, and be incompatible use in an AR interaction of the continuous trigger-action type. For example, in some embodiments, the collision input trigger cannot be used for an AR interaction of the continuous trigger-action type, because the collision input triggers happen instantly. Additionally, users can connect multiple output actions to one input trigger to activate them together or connect multiple input triggers to one output action so that every input trigger can activate the same output action. The visual programming interface rejects an attempted connection between mismatched input triggers and output actions to ensure valid authoring. For instance, the physics simulation output for the physical toy can only be connected to the collision input of virtual content.

The method 300 continues with detecting that a defined input trigger has occurred (block 320). Particularly, based on sensor data received from a sensor or based on user inputs received via the AR system 20, the processor 25 or processor 112 detects occurrence of the input triggers that were previously defined by the user and which are paired with output actions to create AR interactions.

For physical input triggers, the processor 25 or processor 112 detects occurrence of physical input triggers based on sensor data received from one or more sensors, e.g., images received from the camera 29 or sensor data received from a sensor of one of the plug-and-play modules 130A-H. Particularly, the processor 25 or processor 112 detects the physical input trigger by measuring values of a physical state of a respective physical object with the sensor and detecting the physical input trigger based on the values of the physical state of the respective physical object. In the case that the processor 112 of the plug-and-play modules 130A-H detects the input trigger, the AR system 20 receives notification of the detection from the plug-and-play modules 130A-H. Otherwise, the AR system 20 may simply receive the sensor data from the plug-and-play modules 130A-H, from which the system 20 detects the occurrence of the input trigger.

Conversely, for virtual input triggers, the processor 25 detects occurrence of virtual input triggers based on user inputs received via the AR system 20. Particularly, the processor 25 detects the virtual input trigger by recording values of a virtual state of a respective virtual object based on user inputs received via the AR system 20 and detecting the virtual input trigger based on the values of the virtual state of the respective virtual object. For example, a spatial placement virtual input trigger might be detected on the basis of the user virtual manipulating a spatial position of the respective virtual object.

As discussed above, AR interactions can be of a discrete trigger action type or a continuous trigger-action type, which changes the manner in which the input trigger is detected. In the case of a discrete trigger-action type, the processor 25 or processor 112 detects the input trigger in response to a current value of the physical or virtual state of the respective physical or virtual object at least one of (i) having a predefined value and (ii) a being within a predefined range of values. In this way, the output action is only triggered in response a particular condition being satisfied with respect to the physical or virtual state of the respective physical or virtual object.

However, in the case of a continuous trigger-action type, the processor 25 or processor 112 detects the input trigger in response to a change in a current value of the physical or virtual state of the respective physical or virtual object. In this way, the output action is triggered any time there is a change in physical or virtual state of the respective physical or virtual object, such that the state of the output action is always updated to reflect a current state of the input trigger in an analog manner.

The method 300 continues with automatically performing, in response to detecting the input trigger, any defined output actions that are paired with the detected input trigger (block 322). Particularly, in response to detecting an input trigger that is paired with a particular output action, the processor 25 causes the output action to be performed. In the case of a physical output action, in response to detecting an associated input trigger, the processor 25 operates the Wi-Fi module 27 or other transceiver of the AR system 20 to command an actuator, such as an actuator of one of the plug-and-play modules 130A-H, to control the respective physical object to have the physical state that characterizes the physical output action. Conversely, in the case of a virtual output action, in response to detecting an associated input trigger, the processor 25 operates the display screen 28 to display in the AR graphical user interface the virtual output action including the virtual content or virtual object superimposed on the environment and having the virtual state that characterizes the virtual output action.

As discussed above, AR interactions can be of a discrete trigger action type or a continuous trigger-action type, which changes the manner in which the output action is performed. Particularly, in the case of a discrete trigger-action type, in response to detecting the discrete input trigger, the processor 25 causes the physical or virtual object to take on a value of a physical or virtual state that characterizes the output action. However, in the case of a continuous trigger-action type, in response to detecting the continuous input trigger, the processor 25 causes the physical or virtual object to take on value for the physical or virtual state that depends upon the current value of the state of the respective object of the input trigger, according to a mapping that characterizes the output action.

With reference again to FIGS. 6A and 6B, in the Play Mode, the user can enjoy an AR-enhanced toy experience.

Particularly, in illustration (e) of FIG. 6A, the user virtually manipulates the virtual lock 402, which causes the physical chest 400 to automatically open in response to the correct lock code being entered on the virtual lock 402. Similarly, in illustration (e) of FIG. 6B, the user manually opens the physical chest 400, which causes a virtual ghost 404 to automatically be rendered in the AR graphical user interface and appear to pop out of the physical chest 400 when it is opened.

Exemplary Use Cases

FIG. 8A shows an exemplary storytelling toy including a house with a security system. Storytelling is often referred as the process of creating or engaging in narrative structures, which can be a powerful tool for building skills in communication, collaboration, creativity, and retention. The possibilities have been explored of applying AR-enhanced toys as a way for users to physically construct their stories by manipulating toys. At the same time, users could enact their stories by controlling virtual characters. FIG. 8A illustrates a straightforward story: "Bob is an engineer who designed a security system for his house. If a family member arrives at night, the door automatically opens. One day, a thief tried to break in. The security system worked as planned and triggered the alarm. Initially, the thief still wanted to take his chances, but the frequency of the alarm got higher and higher and the warning blinked as he approached the door. He eventually had to run away." The details of the authoring process and interaction encoding are show in FIG. 8A. In illustration (a), the user uses the location of a virtual avatar 800 of family member as an input trigger and a rotation of a door to a toy house 802 as the associated output action. This AR interaction is encoded as 'Spatial Placement (Virtual)—Discrete—Local Movement (Physical).' In illustration (b), the user uses the distance of a virtual avatar 804 of a thief from the toy house 802 as an input trigger to continuously increase a frequency of a buzzer and blink an LED. This AR interaction is encoded as 'Spatial Placement (Virtual)—Continuous—Sensory Effect (Physical).'

Figure 8B:
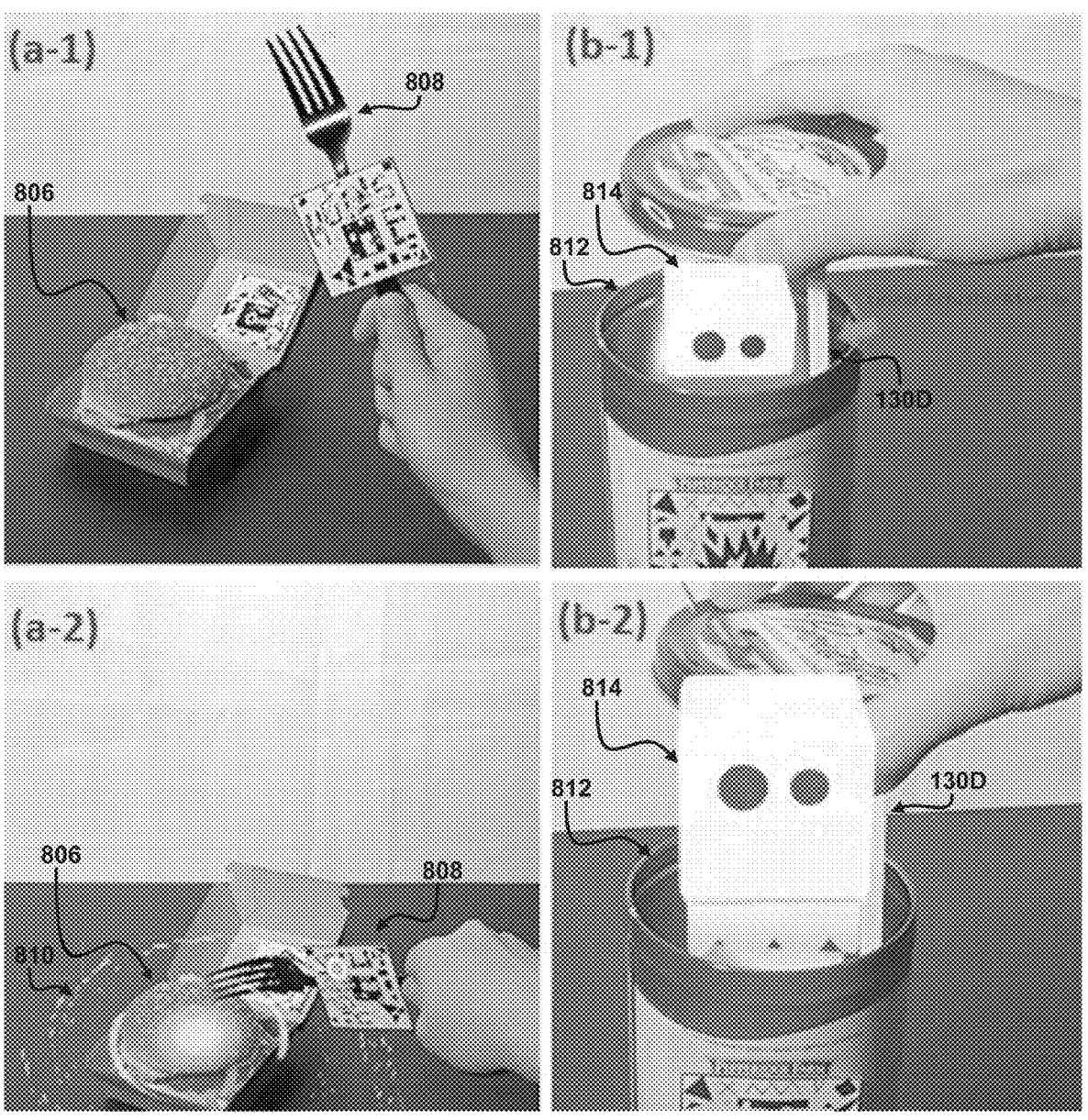
FIG. 8B shows an example in which daily objects are transformed into playful toys.

FIG. 8B shows an example in which daily objects are transformed into playful toys. Particularly, parents can turn daily objects into playful items for their children. Any tangible item that supports playfulness can be defined as a toy. With the plug-and-play modules 130A-H of the IoT toolkit 100, the system 10 supports users' spontaneous transformation of daily objects as a way to entertain everyday life with their imagination. For a first example, a parent can attach a marker to a fork and use it to tap the hamburger the child is having for lunch. Once the fork collides with the hamburger, it triggers a virtual halo effect, which makes the dining experience more enjoyable. In illustration (a-1), the user taps the real hamburger 806 with a fork 808 and, in illustration (a-2), triggers a virtual halo effect 810. To author this interaction, the user uses the collision between the fork 808 and hamburger 806 as an input trigger and virtual halo effect 810 as an output action. This AR interaction is encoded as 'Collision (Physical)—Discrete—Sensory Effect (Virtual).' In a second example, the linear actuator module 130D is attached to the lid and bottom of a cookie jar 812 and a person can linearly control a size of a virtual ghost 814 by moving the lid of the cookie jar 812. In illustration (b-1), the user attaches the two ends of a linear actuator 130D to the bottom and lid of a real cookie jar 812. In illustration (b-2), the user dynamically changes the size of the virtual ghost 814 by moving the lid of the cookie jar 812. To author this interaction, the user uses the linear actuator's current length as an input trigger and global movement of the virtual ghost 814 as an output action. This interaction is encoded as 'Local movement (Physical)—Continuous—Global Movement (Virtual).'

FIG. 8C shows an example in which miniature toys are made more realistic. Particularly, a physical toy fire truck 816 is provided with an adjustable-height virtual water gun 818. In many cases, the toys are simply the miniature replica of their real-world counterpart (e.g., toy trains, toy boats, toy cars). However, some real-world effects cannot be easily reproduced on these toys, thus reducing the realism (e.g., smoke coming out from the toy train) while playing. On the other hand, AR can fill this gap by simulating these events through visual effects. FIG. 8C illustrates a toy fire truck 816 in which the user controls the height of its water gun 818 by manipulating a virtual slider 820. In illustration (a), the user operates the virtual slider 820 to control the height of the water gun 818, which is mounted on top of the linear actuator module 130D. To author this interaction, the user maps a range of values on the slider 820 to a range of values on the linear actuator 130D. This interaction is encoded as 'User Interface (Virtual)—Continuous—Local Movement (Physical).' Meanwhile, the user can push a button module 130A to spray virtual water 822. Inside a toy building 824 near the truck, each floor is placed with a lightning & notification module 130H that initially lights up, indicating a fire. In illustration (b), the user presses the button module 130A on the fire truck 816 as input to spray the virtual water 822. This interaction is encoded as 'User Interface (Physical)—Discrete—Sensory Effect (Virtual)'. If the water sprays on that floor, the light will dim out, which implies the fire has been extinguished. In illustration (c), if the virtual water collides with the physical building 824, then the buzzer & light module 130H, which indicates a fire on that floor, turns off. For this interaction, the user uses collision between building and visual effect to trigger the 'turn off' action of the buzzer & light module 130H. This interaction is encoded as 'Collision (Virtual)—Discrete—Sensory Effect (Physical)'.

Figure 8D:
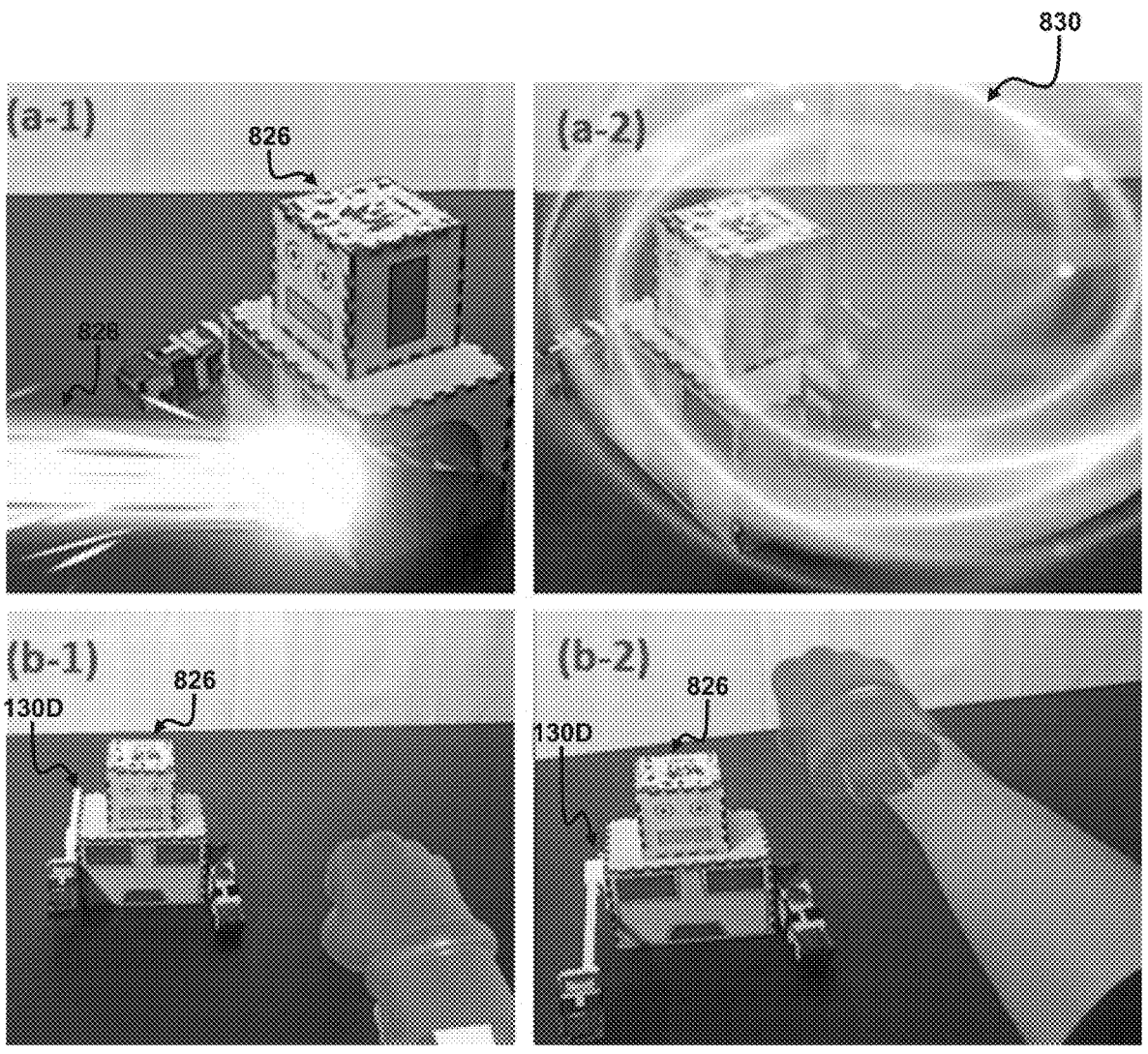
FIG. 8D shows an exemplary manipulable robot 826 that can be controlled to move on its own.

FIG. 8D shows an exemplary manipulable robot 826 that can be controlled to move on its own. Robot-shaped toys are among the most popular toys in the market. These robots often provide multiple degrees of freedom for manipulation. When the user sets it in a specific pose, it triggers a corresponding sound or lightning effect. Leveraging the capability of AR, we can allow the user to add visual effects to the output of the toy. Meanwhile, the body of the robot can move on its own, performing some pre-configured actions. For example, in illustration (a-1), when the robot's left arm (integrated with the rotation module 130E (not shown)) reaches out, the user sets it to emit a virtual laser beam 828. When the robot arm is raised, the user sets it to initiate a virtual shield 830, as shown in illustration (a-2). The user adjusts the robot's parts to different poses and associates them with different visual effects. This process is done by registering the rotation module's angle measurement in real-time. This interaction is encoded as 'Local Movement (Physical)—Discrete—Sensory Effect (Virtual).' Meanwhile, in illustrations (b-1) and (b-2), the user controls the physical arm of the robot 826 (equipped with linear actuator 130D) by moving its digital first in different directions. The user can set the robot 826 to perform the 'punch' action when the virtual first moves forward. This interaction is encoded as 'Spatial Movement (Virtual)—Discrete—Local Movement (Physical).'

Figure 8E:
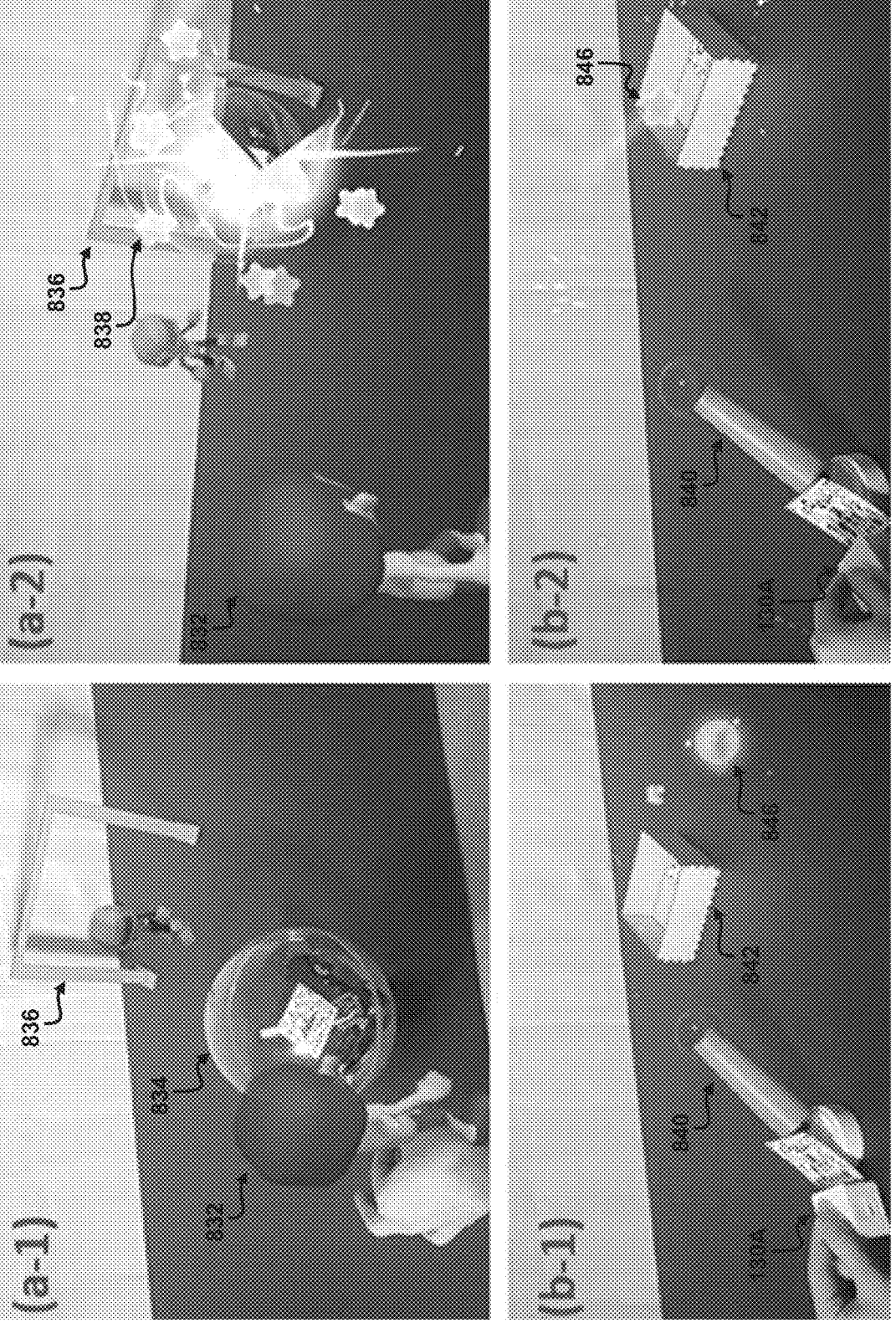
FIG. 8E shows exemplary multiplayer toy games.

FIG. 8E shows exemplary multiplayer toy games. Besides the pure entertainment value, multiplayer games (e.g., board games) offer players opportunities to connect with others.

Research has shown that multiplayer games could be more fun and engaging than single-player ones. Meanwhile, the immersive AR experience can be shared with multiple people simultaneously. Two exemplary multiplayer games are described with AR-enhanced toys that could be authored using the system 10.

In a first game, each user controls a virtual soccer player 832 to move around the field. If a virtual soccer player 832 hits a physical soccer ball 834 equipped with the movement module 130F, the ball will move in the other direction, shown in illustration (a-1). This interaction is encoded as 'Collision (Physical)—Discrete—Physics Simulation (Physical)'. Once the soccer ball 834 move passes the goalpost 836, it will trigger an appearance of a virtual halo effect 838, as shown in illustration (a-2). This interaction is encoded as 'Spatial Movement (Physical)—Discrete—Sensory Effect (Virtual).'

In a second game, one user has a physical 3D printed cannon 840 and two button modules 130A, while another has a physical basket 842 and a haptic module 130G (not shown), as shown in illustrations (b-1) and (b-2). The two button modules 130A are set to trigger two visual effects: firing virtual stars 844 and firing virtual bombs 846, respectively. If a virtual star 844 collides with the basket 842 held by the other user, it triggers the appearance of a virtual sign. This interaction is encoded as 'User Interface-Discrete-Sensory Effect (Virtual)'. Conversely, if a virtual bomb 846 hits the basket 842, it triggers the activation of the haptic module 130G (not shown). This interaction is encoded as 'Collision (Virtual)—Discrete—Sensory Effect (Physical).'

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for providing an augmented reality interaction, the method comprising:

programming, based on user inputs received via an augmented reality device, a physical input trigger of the augmented reality interaction, the physical input trigger being characterized by a physical state of a first physical object in an environment of a user;

programming, based on user inputs received via the augmented reality device, a virtual output action of the augmented reality interaction, the virtual output action being characterized by a virtual state of virtual content to be displayed via the augmented reality device, the virtual output action being programmed by (i) recording values of the virtual state of the virtual content as the user demonstrates the virtual output action by virtually manipulating the virtual content in an augmented reality graphical user interface, and (ii) defining values of the virtual state that characterize the virtual output action based on the recorded values of the virtual state during the user demonstrating the virtual output action;

after programming the physical input trigger and the virtual output action of the augmented reality interaction, detecting, with a sensor, the physical input trigger; and displaying, in response to detecting the physical input trigger, in the augmented reality graphical user interface on a display screen of the augmented reality device, the virtual output action including the virtual content superimposed on the environment and having the virtual state that characterizes the virtual output action.

2. The method according to claim 1, the detecting the physical input trigger further comprising:

measuring values of the physical state of the first physical object with the sensor, the sensor being incorporated with the first physical object; and detecting the physical input trigger based on the values of the physical state of the first physical object.

3. The method according to claim 2, wherein the sensor is integrated into a discrete electronic module, which is removably attached to the first physical object.

4. The method according to claim 1, the programming the physical input trigger further comprising:

measuring, with the sensor, values of the physical state of the first physical object as the user demonstrates the physical input trigger by physically manipulating the first physical object; and defining values of the physical state that characterize the physical input trigger based on the measured values of the physical state during the user demonstrating the physical input trigger.

5. The method according to claim 1, wherein the physical state of the first physical object that characterizes the physical input trigger is at least one of (i) a spatial position of the first physical object, (ii) a pose of a manipulable part of the first physical object, (iii) a collision of the first physical object with a second physical object, (iv) a collision of the first physical object with a virtual object in the augmented reality graphical user interface, and (v) an interaction of the user with the first physical object.

6. The method according to claim 1, wherein the virtual state of the virtual content that characterizes the virtual output action is at least one of (i) a movement of a first virtual object according to a user-defined trajectory, (ii) a movement of a part of a second virtual object, (iii) a movement of a third virtual object according to a physics-based trajectory, and (iv) a visual effect superimposed upon the environment.

7. The method according to claim 1, wherein:

the physical input trigger is detected in response to a current value of the physical state of the first physical object at least one of (i) having a predefined value and (ii) a being within a predefined range of values; and in response to detecting the physical input trigger, the virtual content is triggered to have the virtual state that characterizes the virtual output action.

8. The method according to claim 1, wherein:

the physical input trigger is detected in response to a change in a current value of the physical state of the first physical object; and in response to detecting the physical input trigger, a value of the virtual state of the virtual content is changed to one that depends upon the current value of the physical state of the first physical object and which characterizes the virtual output action.

9. The method according to claim 1 further comprising:

pairing the physical input trigger with the virtual output action based on user inputs provided via a visual programming interface of the augmented reality graphical user interface.

10. A method for providing an augmented reality interaction, the method comprising:

programming, based on user inputs received via an augmented reality device, a virtual input trigger of the augmented reality interaction, the virtual input trigger being characterized by a virtual state of a first virtual object in an augmented reality graphical user interface on a display screen of the augmented reality device, the virtual input trigger being programmed by recording values of the virtual state of the first virtual object as the user demonstrates the virtual input trigger by virtually manipulating the first virtual object in the augmented reality graphical user interface and (ii) defining values of the virtual state that characterize the virtual input trigger based on the recorded values of the virtual state during the user demonstrating the virtual input trigger;

programming, based on user inputs received via the augmented reality device, a physical output action of the augmented reality interaction, the physical output action being characterized by a physical state of a first physical object in an environment of a user;

after programming the virtual input trigger and the physical output action of the augmented reality interaction, detecting, based on user inputs received via the augmented reality device, the virtual input trigger; and commanding, with a processor, in response to detecting the virtual input trigger, an actuator to control the first physical object to have the physical state that characterizes the physical output action.

11. The method according to claim 10, the programming the physical output action further comprising:

measuring, with a sensor, values of the physical state of the first physical object as the user demonstrates the physical output action by physically manipulating the first physical object; and defining values of the physical state that characterize the physical output action based on the measured values of the physical state during the user demonstrating the physical output action.

12. The method according to claim 11, wherein the sensor and the actuator are incorporated with the first physical object.

13. The method according to claim 12, wherein the sensor and the actuator is integrated into a discrete electronic module, which is removably attached to the first physical object.

14. The method according to claim 10, wherein the virtual state of the first virtual object that characterizes the virtual input trigger is at least one of (i) a spatial position of the first virtual object, (ii) a pose of a manipulable part of the first virtual object, (iii) a collision of the first virtual object with a second physical object, (iv) a collision of the first virtual object with a second virtual object in the augmented reality graphical user interface, and (v) an interaction of the user with the first virtual object.

15. The method according to claim 10, wherein the physical state of the first physical object that characterizes the physical output action is at least one of (i) a movement of the first physical object according to a user-defined trajectory, (ii) a movement of a part of the first physical object, (iii) a movement of the first physical object according to a physics-based trajectory, and (iv) a perceptible sensory effect output by the first physical object.

16. The method according to claim 10, wherein:

the virtual input trigger is detected in response to a current value of the virtual state of the first virtual object at least one of (i) having a predefined value and (ii) a being within a predefined range of values; and in response to detecting the virtual input trigger, the actuator is commanded to control the first physical object to have the physical state that characterizes the physical output action.

17. The method according to claim 10, wherein:

the virtual input trigger is detected in response to a change in a current value of the virtual state of the first virtual object; and in response to detecting the virtual input trigger, the actuator is commanded to control the first physical object to change the physical state to a value that depends upon the current value of the virtual state of the first virtual object and which characterizes the physical output action.

18. The method according to claim 10 further comprising:

pairing the virtual input trigger with the physical output action based on user inputs provided via a visual programming interface of the augmented reality graphical user interface.

* * * * *